US010849116B2

United States Patent
Chen et al.

(10) Patent No.: US 10,849,116 B2
(45) Date of Patent: Nov. 24, 2020

(54) REDUCING BLIND DECODING IN ENHANCED CARRIER AGGREGATION

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/146,729

(22) Filed: Sep. 28, 2018

(65) Prior Publication Data

US 2019/0098613 A1 Mar. 28, 2019

Related U.S. Application Data

(63) Continuation of application No. 15/087,520, filed on Mar. 31, 2016, now Pat. No. 10,111,216.

(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/0038* (2013.01); *H04L 5/0041* (2013.01);
(Continued)

(58) Field of Classification Search
None
See application file for complete search history.

(56) References Cited

U.S. PATENT DOCUMENTS

| 9,113,463 B2 | 8/2015 | Chen et al. |
| 2010/0279628 A1 | 11/2010 | Love et al. |

(Continued)

FOREIGN PATENT DOCUMENTS

| CN | 102804670 A | 11/2012 |
| CN | 104349460 A | 2/2015 |

(Continued)

OTHER PUBLICATIONS

Dahlman E., et al., "Downlink Physical-Layer Processing—Chapter 10" In: "4G LTE/LTE-Advanced for Mobile Broadband," Oct. 7, 2013 (Oct. 7, 2013), Elsevier, XP055249210, pp. 161-240, p. 218-p. 223.

(Continued)

*Primary Examiner* — Chi H Pham
*Assistant Examiner* — Vladislav Y Agureyev
(74) *Attorney, Agent, or Firm* — Holland & Hart LLP

(57) ABSTRACT

Methods, systems, and devices for wireless communication are described. A user equipment (UE) may be configured with a carrier aggregation (CA) configuration, which may include a large number of component carriers (CCs). Some of the CCs may be designated as basis CCs, and may have a flexible control channel configuration, while other CCs may be designated as supplemental CCs with a restricted control channel configuration. The restricted control channels may have a reduced number of decoding candidates, which may reduce the complexity and increase the likelihood of successfully decoding the control channels. For example, the restricted control channels may be limited to a subset of aggregation levels, a reduced control region, or other restrictions. In some cases, the CCs may be grouped into basis CCs and supplemental CCs based on physical uplink control channel (PUCCH) groups or based on CCs (Continued)

that utilize enhanced physical downlink control channels (ePDCCH).

27 Claims, 19 Drawing Sheets

Related U.S. Application Data

(60) Provisional application No. 62/142,378, filed on Apr. 2, 2015.

(51) Int. Cl.
  *H04L 1/00* (2006.01)
  *H04L 27/26* (2006.01)
(52) U.S. Cl.
  CPC ........ *H04L 5/0094* (2013.01); *H04L 27/2607* (2013.01); *H04L 5/001* (2013.01); *H04L 5/0048* (2013.01)

(56) References Cited

U.S. PATENT DOCUMENTS

| | | | | |
|---|---|---|---|---|
| 2010/0302983 A1* | 12/2010 | McBeath | ............ | H04W 52/146 370/311 |
| 2010/0303011 A1* | 12/2010 | Pan | ............ | H04L 5/0007 370/328 |
| 2011/0103509 A1* | 5/2011 | Chen | ............ | H04L 5/0053 375/295 |
| 2011/0110315 A1* | 5/2011 | Chen | ............ | H04L 5/0053 370/329 |
| 2011/0269492 A1* | 11/2011 | Wang | ............ | H04W 28/12 455/509 |
| 2011/0292891 A1* | 12/2011 | Hsieh | ............ | H04L 5/001 370/329 |
| 2011/0299489 A1* | 12/2011 | Kim | ............ | H04L 1/0046 370/329 |
| 2012/0044821 A1* | 2/2012 | Kim | ............ | H04L 5/001 370/252 |
| 2012/0076043 A1* | 3/2012 | Nishio | ............ | H04L 1/1861 370/252 |
| 2012/0078933 A1* | 3/2012 | Kim | ............ | H04L 5/0007 707/758 |
| 2012/0113909 A1 | 5/2012 | Jen | | |
| 2012/0127946 A1* | 5/2012 | Nishio | ............ | H04L 1/0038 370/329 |
| 2012/0236814 A1* | 9/2012 | Nishio | ............ | H04L 5/001 370/329 |
| 2012/0243499 A1* | 9/2012 | Moon | ............ | H04L 5/001 370/329 |
| 2012/0314656 A1 | 12/2012 | Hong et al. | | |
| 2013/0088973 A1* | 4/2013 | Yang | ............ | H04L 5/003 370/241 |
| 2013/0114419 A1* | 5/2013 | Chen | ............ | H04W 72/044 370/248 |
| 2013/0121295 A1* | 5/2013 | Saito | ............ | H04L 5/0051 370/329 |
| 2013/0183987 A1* | 7/2013 | Vrzic | ............ | H04L 5/0053 455/450 |
| 2013/0195039 A1 | 8/2013 | Pan et al. | | |
| 2013/0208645 A1* | 8/2013 | Feng | ............ | H04L 5/003 370/312 |
| 2013/0223297 A1 | 8/2013 | Zhang et al. | | |
| 2013/0329711 A1 | 12/2013 | Seo et al. | | |
| 2014/0105158 A1 | 4/2014 | Kim et al. | | |
| 2014/0204897 A1 | 7/2014 | Takeda et al. | | |
| 2014/0211753 A1* | 7/2014 | Choi | ............ | H04W 56/00 370/330 |
| 2014/0286283 A1* | 9/2014 | Kim | ............ | H04L 5/0035 370/329 |
| 2015/0003360 A1* | 1/2015 | Liu | ............ | H04W 72/1278 370/329 |
| 2015/0003407 A1* | 1/2015 | Seo | ............ | H04L 5/0048 370/330 |
| 2015/0029984 A1 | 1/2015 | Wang | | |
| 2015/0055582 A1* | 2/2015 | Park | ............ | H04L 5/0094 370/329 |
| 2015/0063236 A1* | 3/2015 | Seo | ............ | H04W 12/02 370/329 |
| 2015/0237459 A1* | 8/2015 | Webb | ............ | H04L 5/0007 370/312 |
| 2015/0257131 A1* | 9/2015 | Wong | ............ | H04J 11/0086 370/329 |
| 2015/0264665 A1* | 9/2015 | Vos | ............ | H04W 4/70 370/329 |
| 2015/0296518 A1* | 10/2015 | Yi | ............ | H04W 72/042 370/336 |
| 2015/0296542 A1* | 10/2015 | Heo | ............ | H04W 74/0833 370/329 |
| 2016/0105857 A1* | 4/2016 | Takeda | ............ | H04W 52/244 370/329 |
| 2016/0192331 A1 | 6/2016 | Liang et al. | | |
| 2016/0205614 A1* | 7/2016 | Ma | ............ | H04W 48/12 370/329 |
| 2016/0219557 A1 | 7/2016 | He et al. | | |
| 2016/0242161 A1* | 8/2016 | Webb | ............ | H04W 72/046 |
| 2016/0242203 A1* | 8/2016 | You | ............ | H04L 27/2602 |
| 2016/0270038 A1* | 9/2016 | Papasakellariou | .... | H04L 1/1671 |
| 2016/0295560 A1 | 10/2016 | Chen et al. | | |
| 2016/0345364 A1* | 11/2016 | Uchino | ............ | H04W 74/08 |
| 2018/0255541 A1* | 9/2018 | Webb | ............ | H04W 72/042 |
| 2019/0297609 A1* | 9/2019 | Pan | ............ | H04L 5/001 |

FOREIGN PATENT DOCUMENTS

| | | |
|---|---|---|
| JP | 2016529796 A | 9/2016 |
| WO | WO-2013067256 A1 | 5/2013 |
| WO | WO-2014020822 A1 | 2/2014 |
| WO | WO-2014173334 A1 | 10/2014 |

OTHER PUBLICATIONS

International Preliminary Report on Patentability-PCT/US2016/025613, International Search Authority—European Patent Office, Jun. 21, 2017.
International Search Report and Written Opinion—PCT/US2016/025613—ISA/EPO—dated Jun. 22, 2016.
LG Electronics: "Blind Decoding Reduction Methods", 3GPP Draft; R1-102709 BD LGE, 3rd Generation Partnership Project (3GPP), Mobile Competence Centre; 650 Route Des Lucioles; F-06921 Sophia-Antipolis Cedex; France, vol. RAN WG1, no. Montreal, Canada; May 4, 2010, May 4, 2010, SP050119912, pp. 1-3.

* cited by examiner

REDUCING BLIND DECODING IN ENHANCED CARRIER AGGREGATION

CROSS REFERENCES

The present Application for Patent is a continuation application of U.S. patent application Ser. No. 15/087,520 by Chen, et al, entitled "Reducing Blind Decoding in Enhanced Carrier Aggregation" filed Mar. 31, 2016, which claims priority to U.S. Provisional Patent Application No. 62/142,378 by Chen et al., entitled "Reducing Blind Decoding In Enhanced Carrier Aggregation," filed Apr. 2, 2015, each of which is assigned to the assignee hereof and expressly incorporated by reference herein.

BACKGROUND

The following relates generally to wireless communication and more specifically to reducing blind decoding in enhanced carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a wireless network may utilize multiple carriers to communicate with a UE, and each carrier may be configured with a control channel. A UE may monitor each control channel by blindly decoding a number of decoding candidates. As the number of carriers increases, the number of control channels, and thus the number of blind decoding attempts may increase. This may result in an increased number of missed control channel messages, which may cause interruptions in the communication.

SUMMARY

A user equipment (UE) may be configured with a carrier aggregation (CA) configuration including a large number of component carriers (CCs). Some of the CCs may be designated as base CCs, and may have a flexible control channel configuration, while other CCs may be designated as supplemental CCs with a restricted control channel configuration. The restricted control channels may have a reduced number of decoding candidates, which may reduce the complexity and increase the likelihood of successfully decoding the control channels. For example, the restricted control channels may be limited to a subset of aggregation levels, a reduced control region, or other restrictions. In some cases, the CCs may be grouped into basis CCs and supplemental CCs based on physical uplink control channel (PUCCH) groups or based on CCs that utilize enhanced PDCCH (ePDCCH).

A method of wireless communication is described. The method may include receiving a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, monitoring a control channel of the one or more first CCs according to the first control channel restriction, and monitoring a control channel of the one or more second CCs according to the second control channel restriction.

An apparatus for wireless communication is described. The apparatus may include means for receiving a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, means for monitoring a control channel of the one or more first CCs according to the first control channel restriction, and means for monitoring a control channel of the one or more second CCs according to the second control channel restriction.

A further apparatus for wireless communication is described. The apparatus may include a processor, memory in electronic communication with the processor, and instructions stored in the memory and operable, when executed by the processor, to cause the processor to receive a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, monitor a control channel of the one or more first CCs according to the first control channel restriction, and monitor a control channel of the one or more second CCs according to the second control channel restriction.

A non-transitory computer-readable medium storing code for wireless communication is described. The code may include instructions executable to receive a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, monitor a control channel of the one or more first CCs according to the first control channel restriction, and monitor a control channel of the one or more second CCs according to the second control channel restriction.

In some examples of the method, apparatuses, or non-transitory computer-readable medium described herein, the first control channel restriction or the second control channel restriction, or both, comprises a limited number of aggregation levels, a limited set of control information formats, a channel state information (CSI) limitation, a control region limitation, a downlink (DL) transmission mode limitation, or an uplink transmission mode limitation, or any combination thereof. Additionally or alternatively, in some examples monitoring the control channel of the one or more first CCs comprises blindly decoding a first number of control message candidates for the one or more first CCs, and monitoring the control channel of the one or more first CCs comprises blindly decoding a second number of control message candidates for the one or more second CCs, and the second number may be less than the first number based at least in part on the first and second control channel restriction.

In some examples of the method, apparatuses, or non-transitory computer-readable medium described herein, the one or more first CCs are associated with a physical downlink control channel (PDCCH) configuration and the one or more second CCs are associated with one of a PDCCH configuration or an enhanced physical downlink control channel (ePDCCH) configuration. Additionally or alternatively, in some examples the one or more first CCs and the second CCs are grouped based at least in part on a limitation on a number of ePDCCH CCs.

Some examples of the method, apparatuses, or non-transitory computer-readable medium described herein may further include processes, features, means, or instructions for decoding a control message based at least in part on monitoring the control channel of the one or more first CCs, wherein the second control channel restriction is based at least in part on the control message. Additionally or alternatively, some examples may include processes, features, means, or instructions for decoding a control message prior to monitoring the control channel for the one or more second CCs, and the second control channel restriction may be based at least in part on the control message.

Some examples of the method, apparatuses, or non-transitory computer-readable medium described herein may further include processes, features, means, or instructions for decoding a control message based at least in part on monitoring the control channel for the one or more second CCs, wherein the control message comprises a virtual cyclic redundancy check (CRC) based at least in part on a restricted data allocation within a data field. Additionally or alternatively, in some examples the second control channel restriction is based at least in part on a CA configuration comprising more than five CCs.

A further method of wireless communication is described. The method may include receiving a plurality of control messages associated with a plurality of CCs of the CA configuration, decoding DCI from the plurality of control messages, and the DCI may include a PUCCH format indication, and transmitting a control message corresponding to at least one of the plurality of CCs according to the PUCCH format indication.

A further apparatus for wireless communication is described. The apparatus may include means for receiving a plurality of control messages associated with a plurality of CCs of the CA configuration, means for decoding DCI from the plurality of control messages, and the DCI may include a PUCCH format indication, and means for transmitting a control message corresponding to at least one of the plurality of CCs according to the PUCCH format indication.

A further apparatus for wireless communication is described. The apparatus may include a processor, memory in electronic communication with the processor, and instructions stored in the memory and operable, when executed by the processor, to cause the processor to receive a plurality of control messages associated with a plurality of CCs of the CA configuration, decode DCI from the plurality of control messages, wherein the DCI comprises a PUCCH format indication, and transmit a control message corresponding to at least one of the plurality of CCs according to the PUCCH format indication.

A further non-transitory computer-readable medium storing code for wireless communication is described. The code may include instructions executable to receive a plurality of control messages associated with a plurality of CCs of the CA configuration, decode DCI from the plurality of control messages, wherein the DCI comprises a PUCCH format indication, and transmit a control message corresponding to at least one of the plurality of CCs according to the PUCCH format indication.

In some examples of the method, apparatuses, or non-transitory computer-readable medium described herein, the PUCCH format indication is based at least in part on the plurality of CCs comprising more than five CCs.

A further method of wireless communication is described. The method may include receiving a plurality of control messages associated with a plurality of CCs of the CA configuration, identifying a cell index for each of the plurality of CCs based at least in part on the plurality of control messages, and transmitting UCI based at least in part on CC having a lowest cell index of the plurality of CCs.

A further apparatus for wireless communication is described. The apparatus may include means for receiving a plurality of control messages associated with a plurality of CCs of the CA configuration, means for identifying a cell index for each of the plurality of CCs based at least in part on the plurality of control messages, and means for transmitting UCI based at least in part on CC having a lowest cell index of the plurality of CCs.

A further apparatus for wireless communication is described. The apparatus may include a processor, memory in electronic communication with the processor, and instructions stored in the memory and operable, when executed by the processor, to cause the processor to receive a plurality of control messages associated with a plurality of CCs of the CA configuration, identify a cell index for each of the plurality of CCs based at least in part on the plurality of control messages, and transmit UCI based at least in part on CC having a lowest cell index of the plurality of CCs.

A further non-transitory computer-readable medium storing code for wireless communication is described. The code may include instructions executable to receive a plurality of control messages associated with a plurality of CCs of the CA configuration, identify a cell index for each of the plurality of CCs based at least in part on the plurality of control messages, and transmit UCI based at least in part on CC having a lowest cell index of the plurality of CCs.

In some examples of the method, apparatuses, or non-transitory computer-readable medium described herein, the UCI is transmitted using physical uplink shared channel (PUSCH) resources. Additionally or alternatively, some examples may include processes, features, means, or instructions for transmitting the UCI may be based at least in part on the plurality of CCs comprising more than five CCs.

A further method of wireless communication is described. The method may include configuring a wireless device with a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, transmitting a control channel of the one or more first CCs according to the first control channel restriction, and transmitting a control channel of the one or more second CCs according to the second control channel restriction.

A further apparatus for wireless communication is described. The apparatus may include means for configuring a wireless device with a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, means for transmitting a control channel of the one or more first CCs according to the first control channel restriction, and means for transmitting a control channel of the one or more second CCs according to the second control channel restriction.

A further apparatus for wireless communication is described. The apparatus may include a processor, memory in electronic communication with the processor, and instructions stored in the memory and operable, when executed by the processor, to cause the processor to configure a wireless device with a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, transmit a control channel of the one or more first CCs according to the first control channel restriction, and transmit a control channel of the one or more second CCs according to the second control channel restriction.

A further non-transitory computer-readable medium storing code for wireless communication is described. The code may include instructions executable to configure a wireless device with a CA configuration comprising one or more first CCs associated with a first control channel restriction and one or more second CCs associated with a second control channel restriction different from the first control channel restriction, wherein the first control channel restriction or the second control channel restriction, or both, comprises a decoding candidate restriction, transmit a control channel of the one or more first CCs according to the first control channel restriction, and transmit a control channel of the one or more second CCs according to the second control channel restriction.

In some examples of the method, apparatuses, or non-transitory computer-readable medium described herein, the first control channel restriction or the second control channel restriction, or both, comprises a limited number of aggregation levels, a limited set of control information formats, a CSI limitation, a control region limitation, a DL transmission mode limitation, or an uplink transmission mode limitation transmission mode limitation, or any combination thereof. Additionally or alternatively, in some examples the one or more first CCs are associated with a PDCCH configuration and the one or more second CCs are associated with an ePDCCH configuration.

BRIEF DESCRIPTION OF THE DRAWINGS

Aspects of the disclosure are described in reference to the following figures.

DETAILED DESCRIPTION

A UE may be configured with a carrier aggregation (CA) configuration including a large number of component carriers (CCs). Some of the CCs may be designated as base CCs with a flexible control channel configuration, while other CCs may be designated as supplemental CCs with a restricted control channel configuration. The restricted control channels may have a reduced number of decoding candidates.

Aspects of the disclosure are initially described in the context of a wireless communication system. Various examples are then described in which a control region or a set of aggregation levels may be limited. These and other aspects of the disclosure are further illustrated by and described with reference to apparatus diagrams, system diagrams, and flowcharts that relate to reducing blind decoding in enhanced carrier aggregation.

Figure 1:
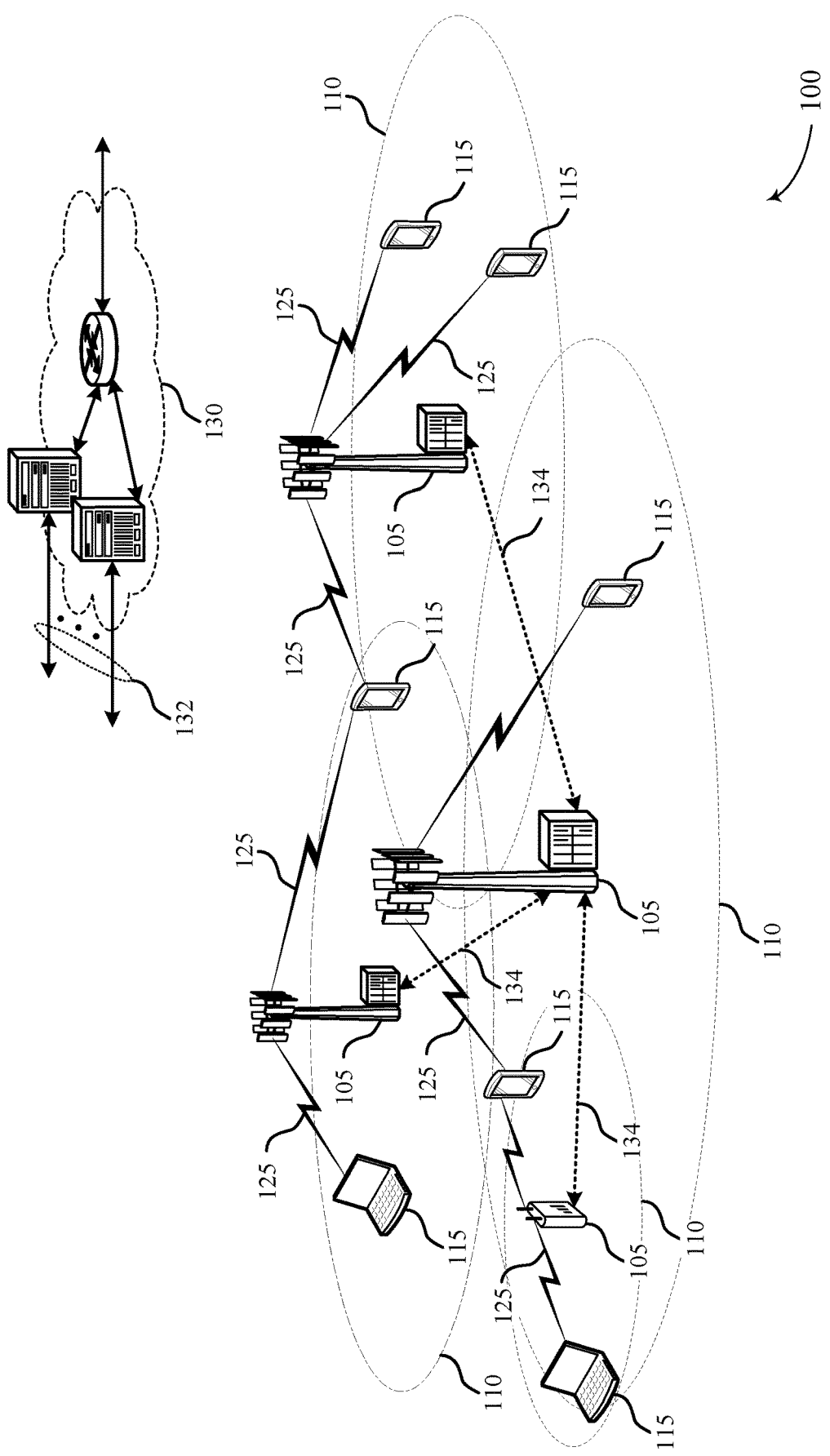
FIG. 1 illustrates an example of a wireless communications system that supports reducing blind decoding in enhanced carrier aggregation in accordance with various aspects of the present disclosure.

FIG. 1 illustrates an example of a wireless communications system 100 that supports reducing or reduced blind decoding in enhanced carrier aggregation in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may be a cellular phone, a wireless modem, a handheld device, a personal computer, a tablet, a personal electronic device, a machine type communication (MTC) device or the like. The UEs 115 may communicate with base stations 105, which may include using both basis CCs and supplemental CCs, as described herein.

The base stations 105 may support, and may communicate with the core network 130 and with one another. For example, the base stations 105 may interface with the core network 130 through backhaul links 132 (e.g., S1, etc.). The base stations 105 may also communicate with one another over backhaul links 134 (e.g., X2, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

A communication link 125 may include one or more frequency ranges organized into carriers. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may, in some examples, provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. Some wireless systems may be limited to a five component carriers per UE 115. However, in some systems, such as a system utilizing enhanced CA (eCA) operations, an increased number of carriers may be used (e.g., up to 32 CCs).

In some cases, a CC may be limited to a frequency range of up to 20 MHz. Different CCs may utilize different combinations of frequency division duplexing (FDD) and time division duplexing (TDD). In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment groups (TAGs). Each TAG may be associated with a different timing offset, such that the UE 115 may synchronize UL transmissions differently for different UL carriers.

A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., physical uplink control channel (PUCCH), may be carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some cases, one or more SCells may be designated to carry PUCCH, and other SCells may be organized into PUCCH groups based on which CC is used to carry the associated UL control information. If a large number of CCs are configured, they may also be grouped into basis CCs and supplemental CCs with a restricted or simplified control channel configuration to reduce the probability of missing a control channel transmission.

In some cases, an enhanced CC (eCC) may be configured, which may utilize a variable TTI length. An eCC may thus include use of a reduced or variable symbol duration. In some cases the symbol duration may remain the same, but each symbol may represent a distinct TTI. In some cases, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Downlink control information may be carried in a physical downlink control channel (PDCCH). PDCCH may carry downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures, and the like. The UE-specific search space may include user-specific control information. CCEs may be indexed, and the common search space may start from CCE 0. The starting index for a UE specific search space may depend on the C-RNTI, the subframe index, the CCE aggregation level and a random seed.

A UE 115 may attempt to decode DCI by performing a process known as a blind decode, during which decoding candidates in common and UE-specific search spaces are decoded (without specific knowledge of whether the candidates will actually contain a PDCCH transmission) until the DCI is detected. During a blind decode, the UE 115 may attempt to descramble all potential DCI messages using its C-RNTI, and perform a cyclic CRC to determine whether the attempt was successful. The complexity of the blind decoding (and the likelihood of missing a PDCCH (or receiving a false positive) may depend on the total number of decoding candidates, which in turn may depend on the number of scheduled CCs and the number of decoding candidates per CC. If a large number of CCs are scheduled, the likelihood of an error may be decreased by reducing the number of decoding candidates per CC. As described herein, blind decoding may include monitoring a CC or a particular region of a CC.

PUCCH may be used for UL acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for SR and CQI reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

In some cases, a wireless communications system may utilize one or more enhanced CCs (eCCs). An eCC may be characterized by one or more features including: flexible bandwidth, variable length transmission time interval (TTIs), and modified control channel configuration. In some cases, an eCC may be associated with a carrier aggregation configuration or a dual connectivity configuration (i.e., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, a base station 105 may gather channel condition information from a UE 115 in order to efficiently configure schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a CQI representing the highest MCS that may be used. CQI may be calculated by a UE 115 after receiving predetermined pilot symbols such as cell-specific reference signals (CRS) or channel state information (CSI)-RS. RI and PMI may be excluded if the UE 115 does not support spatial multiplexing (or is not in support spatial mode). The types of information included in the report determine a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. In some cases, channel reporting may be restricted for some CCs. For example, if a large number of CCs are divided in to basis CC's and Thus, a UE 115 may be configured with a CA configuration including a large number of CCs. Some of the CCs may be designated as base or basis CCs, and may have a flexible control channel configuration, while other CCs may be designated as supplemental CCs with a restricted control channel configuration. The restricted control channels may have a reduced number of decoding candidates, which may reduce the complexity and increase the likelihood of successfully decoding the control channels. For example, the restricted control channels may be limited to a subset of aggregation levels, a reduced control region, or other restrictions. In some cases, the CCs may be grouped into basis CCs and supplemental CCs based on PUCCH groups or based on CCs that utilize ePDCCH.

Figure 2:
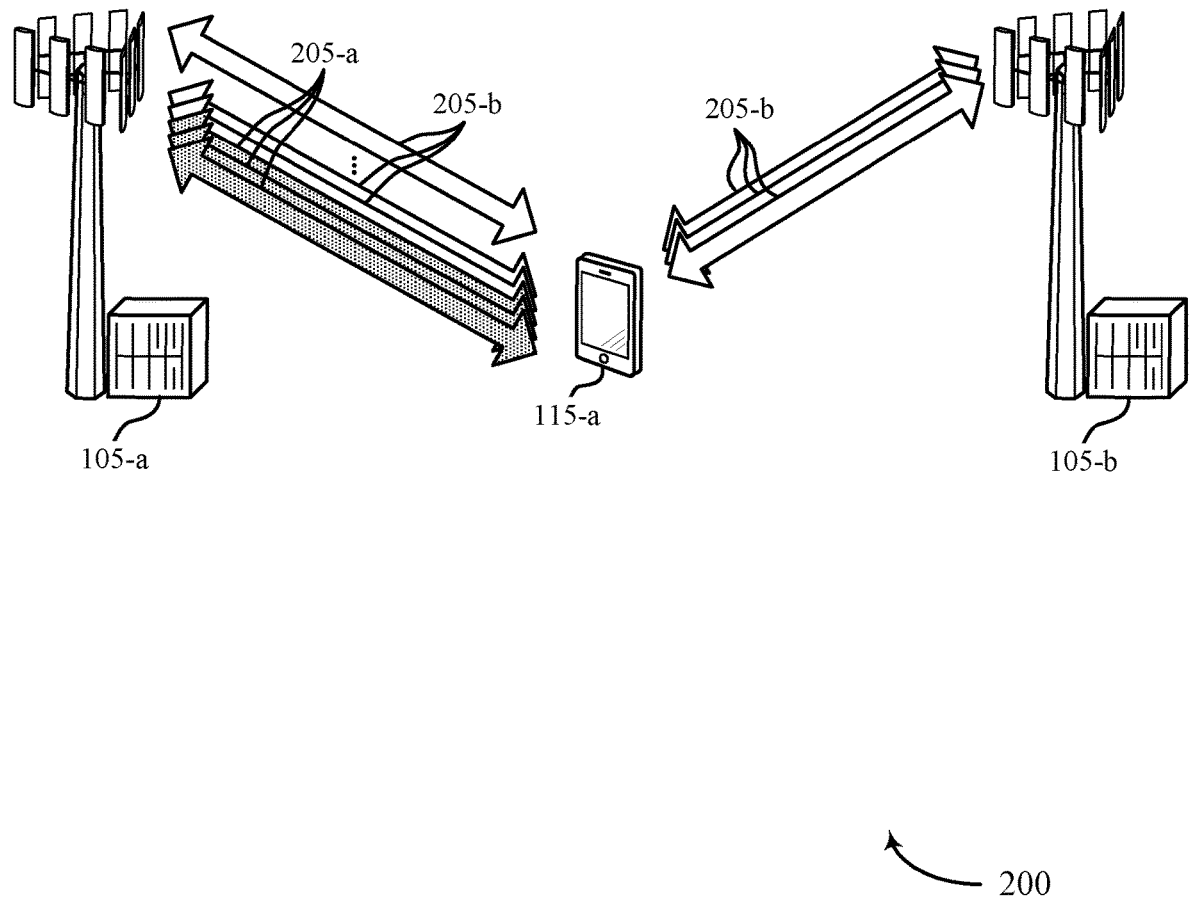
FIG. 2 illustrates an example of a wireless communications system that supports reducing blind decoding in enhanced carrier aggregation in accordance with various aspects of the present disclosure.

FIG. 2 illustrates an example of a wireless communications system 200 for reducing blind decoding in enhanced carrier aggregation in accordance with various aspects of the present disclosure. Wireless communications system illustrates an example of a UE 115-a communicating with base stations 105-a and 105-b using two groups of CCs 205. UE 115-a, base station 105-a, and base station 105-b may be examples of the corresponding devices described with reference to FIG. 1.

UE 115-a may be configured with a relatively large number of CCs (e.g., greater than five CCs), so the likelihood of missing a PDCCH transmission or falsely detecting a PDCCH may be increased. For example, if the probability of missing a PDCCH transmission is 1% for each CC, the probability of missing at least one PDCCH may be higher than 23%. The probability of a miss may depend on the total number of decoding candidates across CCs. If 5 CCs may include 264 total decoding candidates, 32 CC's may include a total of 1560 decoding candidates.

Missing a PDCCH transmission may result in problems that impede wireless communication. A missed PDCCH may directly result in a missed DL grant or a missed UL grant. Or, if PUCCH is transmitted together with PUSCH, missing a PDCCH transmission may result in a misalignment of which PUSCH transmission to use for PUCCH transmission. In other examples, the PUCCH format or UL power control may depend on the number of detected PDCCH transmissions.

In some cases, a false positive may be less likely than missing a PDCCH. However, increasing the number of CCs (and thus, the number of decoding candidates) may also increase the number of false positives. A false detection of PDCCH may result in a false detection of an UL or DL grant. This may cause UE 115-a to transmit an erroneous PUCCH or PUSCH, respectively.

To mitigate the problems of missed PDCCH detection and false PDCCH detection that may be associated with an increased number of CCs, UE 115-a may be configured to reduce the decoding complexity of one or more CCs. For example, the configured CCs may be grouped into a first set of basis CCs 205-a that have a default configuration, and a second group of supplemental CCs 205-b that have a restricted configuration. The restriction may include reducing the number of decoding candidates on each supplemental CC 205-b relative to the number of decoding candidates on each basis CC 205-a.

Other adjustments for supplemental CCs 205-b may include avoiding certain numbers of scheduled CCs associated at PUCCH format boundaries, explicitly signaling a PUCCH format, scheduling additional transmit power, limiting the transmission of aperiodic CSI reports, limiting the use of ePDCCH (which may involve a more complex decoding process), using a virtual CRC (e.g., by setting the bits for certain unused fields to one, such as a transmit power control (TPC) field or an aperiodic CSI field), limiting the use of cell-specific reference signal (CRS) based transmission modes, or even eliminating CRS.

In some examples, various CRC lengths may be used for basis CCs 205-a and supplemental CCs 205-b. For instance, for a set of basis CCs 205-a, the CRC length for PDCCH or ePDCCH, or both, may be 16 bits. This set of basis CCs 205-a may be or include a PCell or other CCs with PUCCH. Other carriers, such as supplemental CCs 205-b may have a CRC length for PDCCH or ePDCCH, or both, of 20 or 24 bits, for instance. In this way, false alarm probability can be reduced while, at the same time, some backward compatibility can be achieved for the basis CCs 205-a.

Additionally or alternatively, CRC length may vary by search space, decoding candidate, radio network temporary identifier (RNTI), or the like. For example, a common search space may be associated with a 16-bit CRC, while a UE-specific search space may be associated with a 20-bit CRC. Likewise, in some cases, a first decoding candidate may be associated with a 16-bit CRC, while a second decoding candidate may be associated with a 20-bit CRC. In other examples, a P-RNTI-, RA-RNTI-, or SI-RNTI-based PDCCH may be associated with a 16-bit CRC, while C-RNTI-based PDCCH may be associated with a 20-bit CRC.

In some cases, UCI may be transmitted parallel to PUSCH to avoid misalignment. For example, parallel PUCCH and PUSCH may be used whenever the number of UL CCs configured is greater than one. In some cases, parallel transmission of PUCCH and PUSCH may be configured dynamically with explicit or implicit signaling, and may be managed on a PUCCH group basis. For example, parallel transmission may be enabled when the number of scheduled UL CCs is two or more.

Basis CCs 205-a and supplemental CCs 205-b may be configured dynamically or semi-statically. The assignment may be UE specific (rather than using the same configuration for each UE 115 served by a base station 105). The grouping may be based on the cell ID of SCells, on PUCCH groups, or on groups of CCs using ePDCCH. In some cases, a certain number of basis CCs may be assigned for each PUCCH group. For example, five basis CCs 205-a may be configured if UE 115-a has a single PUCCH group, and three basis CCs 205-a may be assigned to each PUCCH group if UE 115-a is configured with more than one PUCCH group.

Figure 3A:
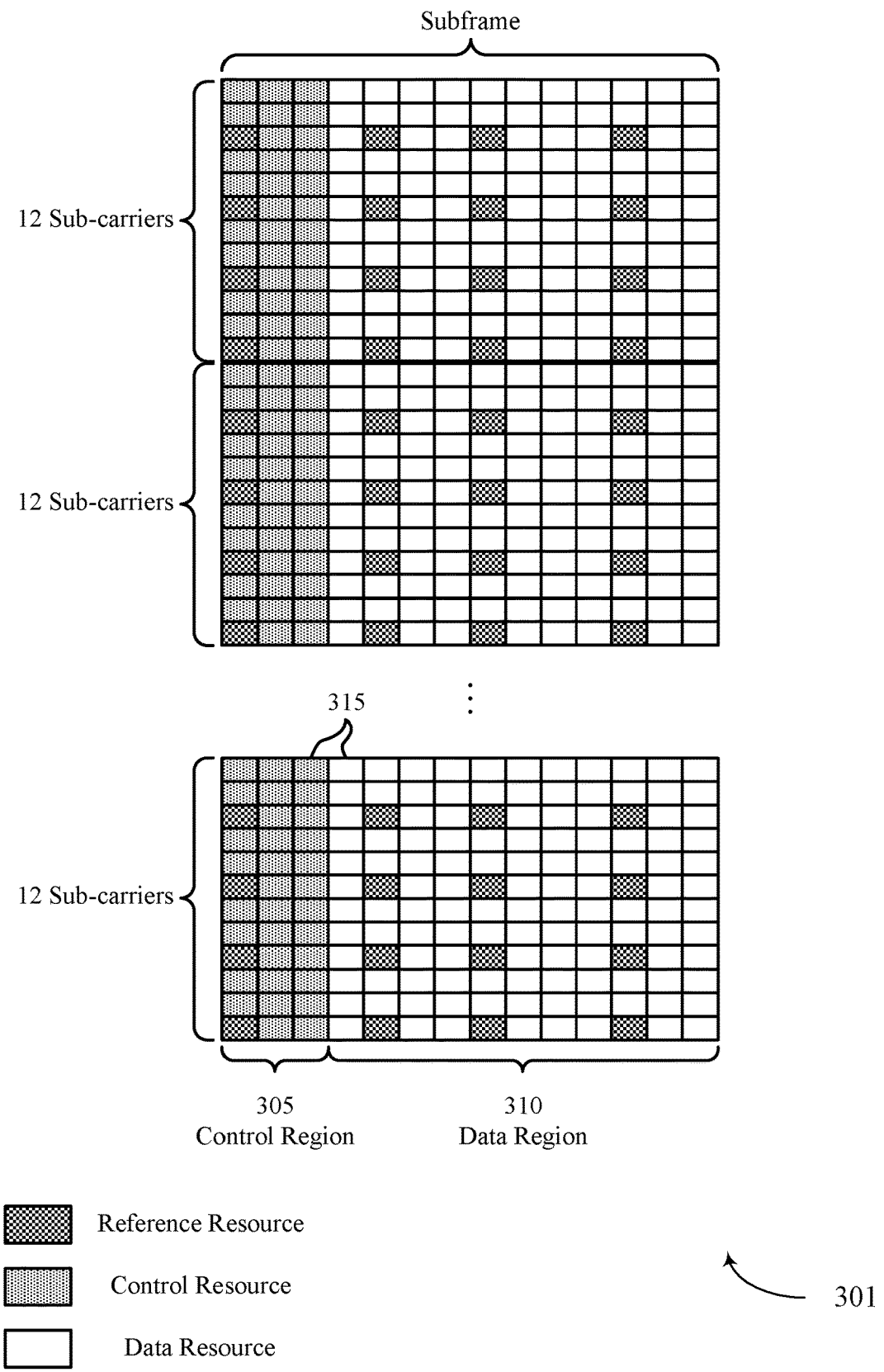
FIG. 3A illustrates an example of a physical layer resource structure that supports reducing blind decoding in enhanced carrier aggregation in accordance with various aspects of the present disclosure.

FIG. 3A illustrates an example of a physical layer resource structure 301 for reducing blind decoding in enhanced carrier aggregation in accordance with various aspects of the present disclosure. Physical layer resource structure 300 may be utilized a UE 115 or a base station 105 as described with reference to FIGS. 1-2.

Physical layer resource structure 301 may include a control region 305 and a data region 310. Each region may be divided into resource elements (REs) 315. physical layer resource structure 301 may represent the organization of a CC over the course of a 1 ms subframe. Subframes may be grouped into frames (not shown). Each sub-frame may include two consecutive time slots consisting include 6 or 7 OFDMA symbol periods. A resource element (RE) 315 consists of one symbol period and one subcarrier (a 15 kHz frequency range).

A resource block may contain 12 consecutive subcarriers in the frequency domain and, for a normal cyclic prefix in each OFDM symbol, 7 consecutive OFDM symbols in the time domain (1 slot), or 84 resource elements. Some REs 315 may be reserved for reference signal transmissions. Reference signals (RS) may include DL reference signals (DL-RS) such as CRS and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE 115 receives and the higher the modulation scheme, the higher the data rate may be.

The REs 315 of control region 305 may be grouped into 4 RE sets called resource element groups (REGs), and 9 REGs (or 36 REs) may be grouped into a control channel element (CCE), which may be the smallest unit used for a PDCCH transmission. Physical layer resource structure 301 illustrates an example in which control region 305 covers 3 symbol periods. However, in some cases control region 305 may cover one or two symbol periods. The size of control region 305 may be indicated using a physical control format indicator channel (PCFICH) transmitted using selected REs 315 within the first symbol period (not shown).

The complexity of monitoring control region 305 may be reduced for certain CCs (e.g., supplemental CCs) by limiting the size of control region 305. For example, the number of symbol periods used for control region 305 may be limited (i.e., reduced or restricted to certain sizes). Also, the frequency range used for PDCCH transmissions to a UE 115 may be limited. For example, the CCEs of control region 305 may be divided into a common search space that may be monitored by a number of UE 115 and a UE specific search space that is monitored by a single UE 115. Limiting the search space (either common or UE specific) may reduce the number of potential decoding candidates, and therefore reduced the likelihood of experiencing an error in detecting PDCCH.

Figure 3B:
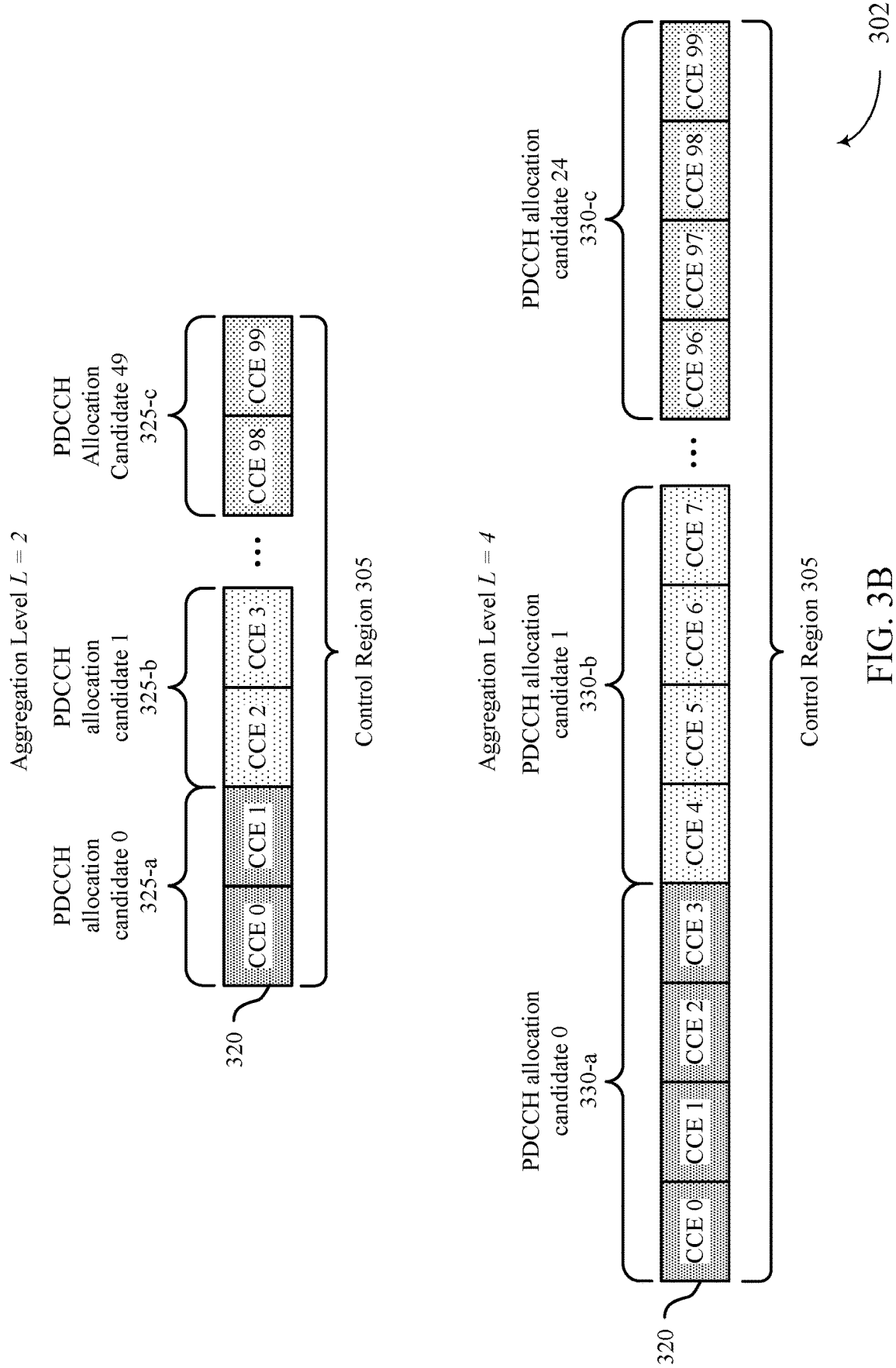
FIG. 3B illustrates an example of an decoding candidate configuration that supports reducing blind decoding in enhanced carrier aggregation in accordance with various aspects of the present disclosure.

FIG. 3B illustrates an example of a decoding candidate configuration 302 for reducing blind decoding in enhanced carrier aggregation in accordance with various aspects of the present disclosure. Decoding candidate configuration 302 may be an example of an organization of CCEs 320 of a physical layer resource structure 301 used by a UE 115 or a base station 105 as described with reference to FIGS. 1, 2, and 3A.

As described above, a physical layer resource structure 301 may be organized into CCEs 320, which may be the smallest number of resources used for transmission of PDCCH. However, in some cases a PDCCH transmission includes more bits than may be transmitted using a single CCE 320. For example, the PDCCH transmission may use a low modulation and coding scheme (MCS) in which a small number of bits are conveyed in each RE, the PDCCH transmission may include a large amount of information, or the PDCCH transmission may be based on a low coding rate or a high level of redundancy. The number of CCEs 320 used for the PDCCH transmission may be referred to as the aggregation level (i.e., the level of CCE aggregation). Decoding candidate configuration 302 illustrates a control region 305 organized according to two different aggregation levels, L: L=2 and L=4.

In the example of FIG. 3B, when L=2, each level 2 PDCCH allocation candidate 325 includes two CCEs 320. Thus, if physical layer resource structure 301 includes 100 CCEs 320 (from 0 to 99), it may be divided into 50 level 2 PDCCH allocation candidates 325. In the example of FIG. 3B, when L=4, each level 4 PDCCH allocation candidate 330 includes four CCEs 320. Thus, if physical layer resource structure 301 includes 100 CCEs 320, it may be divided into 25 level 2 PDCCH allocation candidates 325. Note that the same CCEs 320 may be organized in multiple ways. Thus, a UE 115 may be configured to monitor a search space including multiple aggregation levels such as aggregation levels 1, 2, 4, and 8. Monitoring multiple aggregation levels may increase the number of decoding candidates. Accordingly, if the number of aggregation levels a UE 115 is limited for a set of CCs (e.g., to level 4 and level 8), the number of decoding candidates may be decreased, which may reduce the likelihood of an error in detecting PDCCH.

Figure 4:
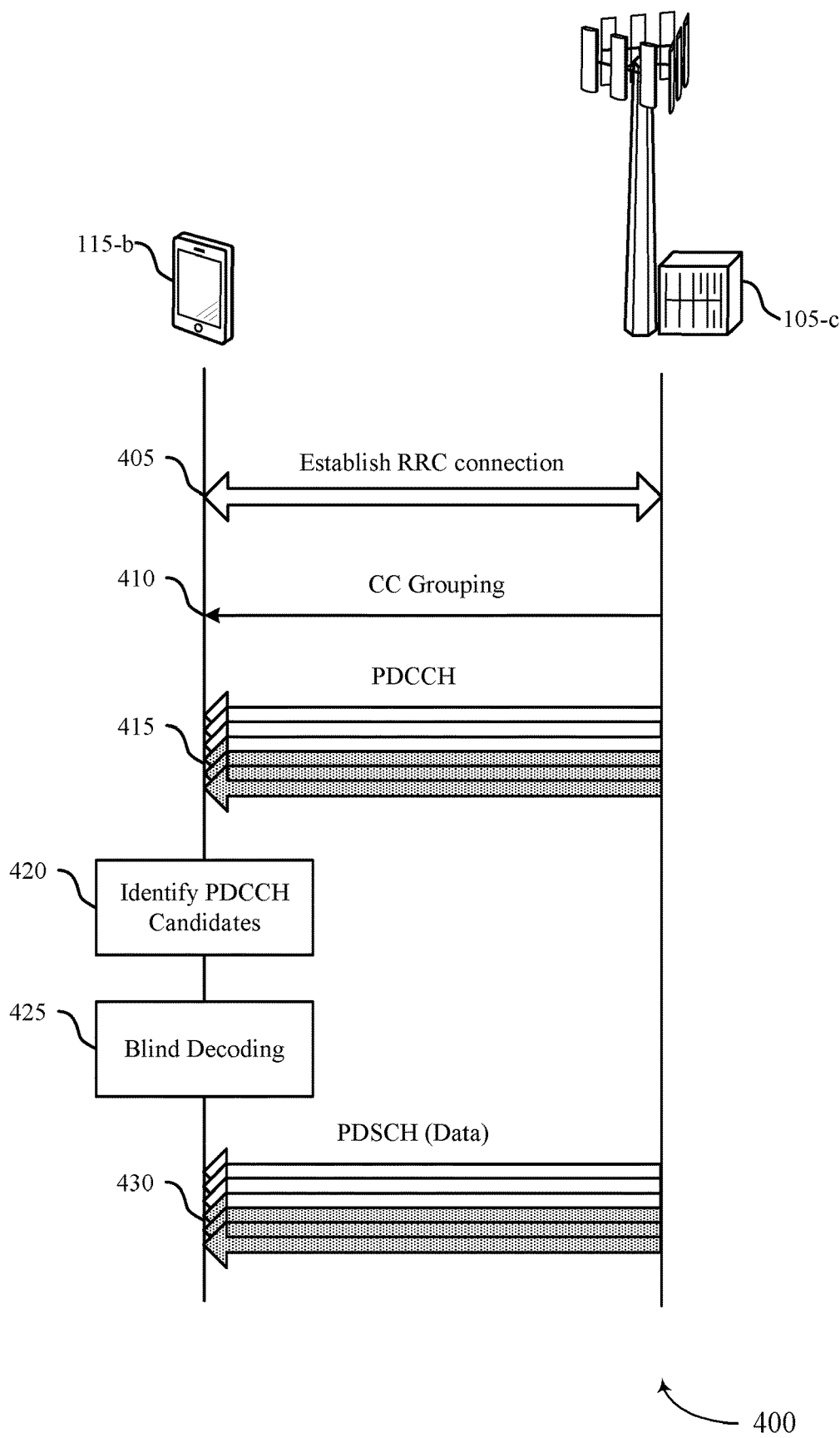
FIG. 4 illustrates an example of a process flow that supports reducing blind decoding in enhanced carrier aggregation in accordance with various aspects of the present disclosure.

FIG. 4 illustrates an example of a process flow 400 for reducing blind decoding in enhanced carrier aggregation in accordance with various aspects of the present disclosure. Process flow 400 may include a UE 115-$b$ and a base station 105-$c$, which may be an example of a base station 105 as described with reference to FIGS. 1-2.

At 405, UE 115-$b$ and base station 105-$c$ may establish an RRC connection, including a CA configuration with a relatively large number of CCs (e.g., greater than 5). UE 115-$a$ may receive a CA configuration from base station 105-$c$ including one or more first CCs associated with a first control channel restriction and one or more second CCs associated with a second control channel restriction different from the first control channel restriction, wherein the first control channel restriction or the second control channel restriction, or both, comprises a decoding candidate restriction. In some examples, the second control channel restriction is based on a CA configuration that includes more than five CCs.

Control channel restriction as used herein may, from the perspective of base station 405, refer to certain restrictions with respect to control channel signaling. For instance, base station 105-$c$ may configure CCs as basis CCs or supplemental CCs on a per-UE basis. For basis CCs base station 105-$c$ may observe certain restrictions with respect to signaling. In some examples, basis CC control channels are managed with full flexibility according to the LTE standard (e.g., no additional restrictions are imposed). For supplemental CCs, base station 105-$c$ may observe different restrictions with respect to control channel signaling, which may include refraining from use of certain DCI formats, limits on aggregation levels of UE-specific search spaces, limits on total number of blind decoding operations by controlling a number of CCEs that are monitoring candidates, or the like. Control channel restriction may thus, from the perspective of base station 105-$c$, refer to control channel management.

From the perspective of UE 115-$b$, control channel restrictions may indicate or imply how UE 115-$b$ should monitor a control channel. For basis CCs, UE 115-$b$ may monitor control channels according to limited restrictions. For example, UE 115-$b$ may monitor a control channel as specified in the LTE standard. For supplemental CCs, for instance, UE 115-$b$ may not need to check for certain DCI formats, search certain aggregation levels, or the like. In some examples, control channel restrictions also include limiting a number of ePDCCH transmissions in a given interval (e.g., number of subframes). Control channel restriction may thus, from the perspective of UE 115-$b$, refer to control channel usage or utilization.

At 410, UE 115-$a$ may receive a message from base station 105-$c$ grouping the CCs into one or more first CCs (referred to herein as "basis CCs") and one or more second CCs (referred to herein as "supplemental CCs"). In some cases, the grouping message may be a part of the RRC configuration. In some examples, the one or more first CCs are associated with a physical downlink control channel (PDCCH) configuration and the one or more second CCs are associated with an ePDCCH configuration. In some examples, the one or more first CCs and the second CCs are grouped based on a limitation on a number of ePDCCH CCs. For instance, UE 115-$b$ may be configured to monitor CCs of the first or second group for ePDCCH.

At 415, base station 105-$c$ may transmit a number of control channels using the configured CCs. UE 115-$b$ may monitor the control channels of the one or more first CCs according to a first control channel restriction (which may be a based on a flexible configuration, that is, a default control channel configuration, such as provided in the LTE standard), and may monitor a control channel of the one or more second CCs according to the second control channel restriction (which may be more limited than the first). In some examples, the second control channel restriction includes a limited number of aggregation levels, a limited set of control information channels, a limited number of decoding candidates, a CSI limitation, a control region limitation, a DL transmission mode limitation, or a UL transmission mode limitation, or a combination thereof.

Base station 105-$c$ may determine a PUCCH format for a wireless device based on a number of scheduled CCs. Base station 105-$c$ may transmit DCI to UE 115-$a$, which may include an indication of the PUCCH format. In some examples, the indication of the PUCCH format is based on the CCs including more than five CCs. Base station 105-$c$ may identify a CC scheduling limitation based on an association between a number of scheduled CCs and a PUCCH format. Base station 105-$c$ may schedule at least one CC for a wireless device based on the scheduling limitation. In some examples, the CC scheduling limitation is based on the number of scheduled CCs including more than five CCs.

At 420, UE 115-a may identify a set of PDCCH decoding candidates based on the first and second control channel restrictions. For example, the number of PDCCH decoding candidates for each CC in the set of first (or basis) CCs may be determined according to the LTE standard and may include more than the number of decoding candidates in the PDCCH decoding candidates in each of the second (or supplemental) CCs based on the different restrictions. Thus, UE 115-b may receive a several control messages associated with a number of CCs. For example, a control message may be a control channel message such as a PDCCH message, an RRC configuration message, or another control message.

At 425, UE 115-a may blindly decode the control channels based on the identified decoding candidates. Thus, in some examples, monitoring the control channel of the one or more first CCs includes blindly decoding a first number of control message candidates for the one or more first CCs, and monitoring the control channel of the one or more second CCs includes blindly decoding a second number of control message candidates for the one or more second CCs, and the second number may be less than the first number based on the first and second control channel restriction.

In some cases, UE 115-b may decode a control message based on monitoring the control channel of the one or more first CCs, where the second control channel restriction may be based on the first control message. UE 115-b may decode a control message prior to monitoring the control channel for the one or more second CCs, and the second control channel restriction may be based on the control message. UE 115-b may decode a control message based on monitoring the control channel for the one or more second CCs, and the control message may include a virtual CRC based on a restricted data allocation within a data field.

UE 115-b may decode DCI from the several control messages, where the DCI may include a PUCCH format indication. In some cases, UE 115-b or base station 105-c may identify a cell index for each of the several CCs based on the control messages.

At 430, UE 115-a may receive a DL shared channel (e.g., for user data) based on the control channel messages received based on the blind decoding. In some cases the PDSCH is sent simultaneously with the PDCCH (in the same TTI), and the transmission is buffered until the control channels are decoded. In some cases, UE 115-b may transmit uplink control information (UCI) based on a CC having a lowest cell index of the scheduled CCs. In some examples, the UCI is transmitted using PUSCH resources.

Figure 5:
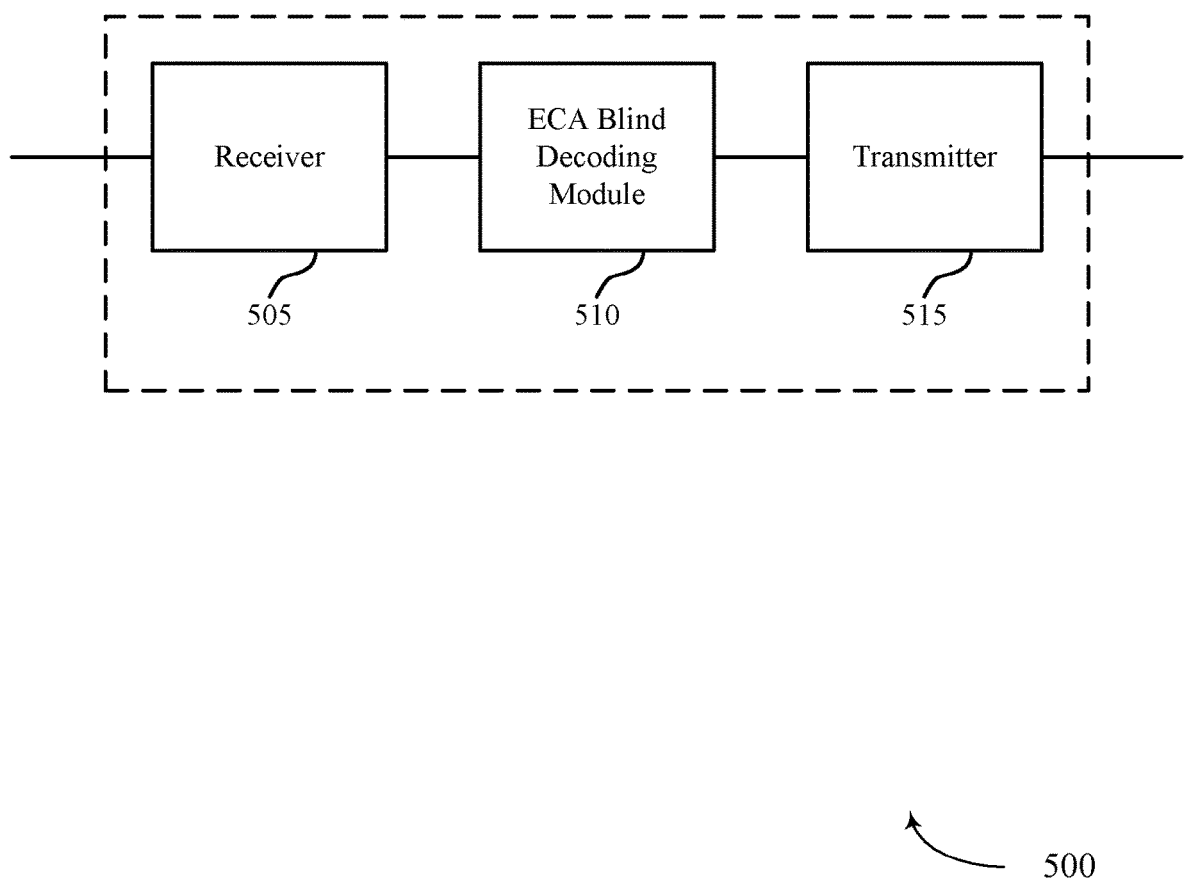
FIGS. 5-7 show block diagrams of a wireless device that supports reducing blind decoding in enhanced carrier aggregation in accordance with various aspects of the present disclosure.

FIG. 5 shows a block diagram of a wireless device 500 that supports reducing blind decoding in enhanced carrier aggregation in accordance with various aspects of the present disclosure. Wireless device 500 may be an example of aspects of a UE 115 described with reference to FIGS. 1-4. Wireless device 500 may include a receiver 505, an eCA blind decoding module 510, or a transmitter 515. Wireless device 500 may also include a processor. Each of these components may be in communication with each other.

The receiver 505 may receive information such as packets, user data, or control information associated with various information channels (e.g., control channels, data channels, and information related to reducing blind decoding in enhanced carrier aggregation, etc.). Information may be passed on to the eCA blind decoding module 510, and to other components of wireless device 500.

The eCA blind decoding module 510 may receive a CA configuration that includes one or more first CCs associated with a first control channel restriction and one or more second CCs associated with a second control channel restriction different from the first control channel restriction, wherein the first control channel restriction or the second control channel restriction, or both, comprises a decoding candidate restriction, monitor a control channel of the one or more first CCs according to the first control channel restriction, and monitor a control channel of the one or more second CCs according to the second control channel restriction.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
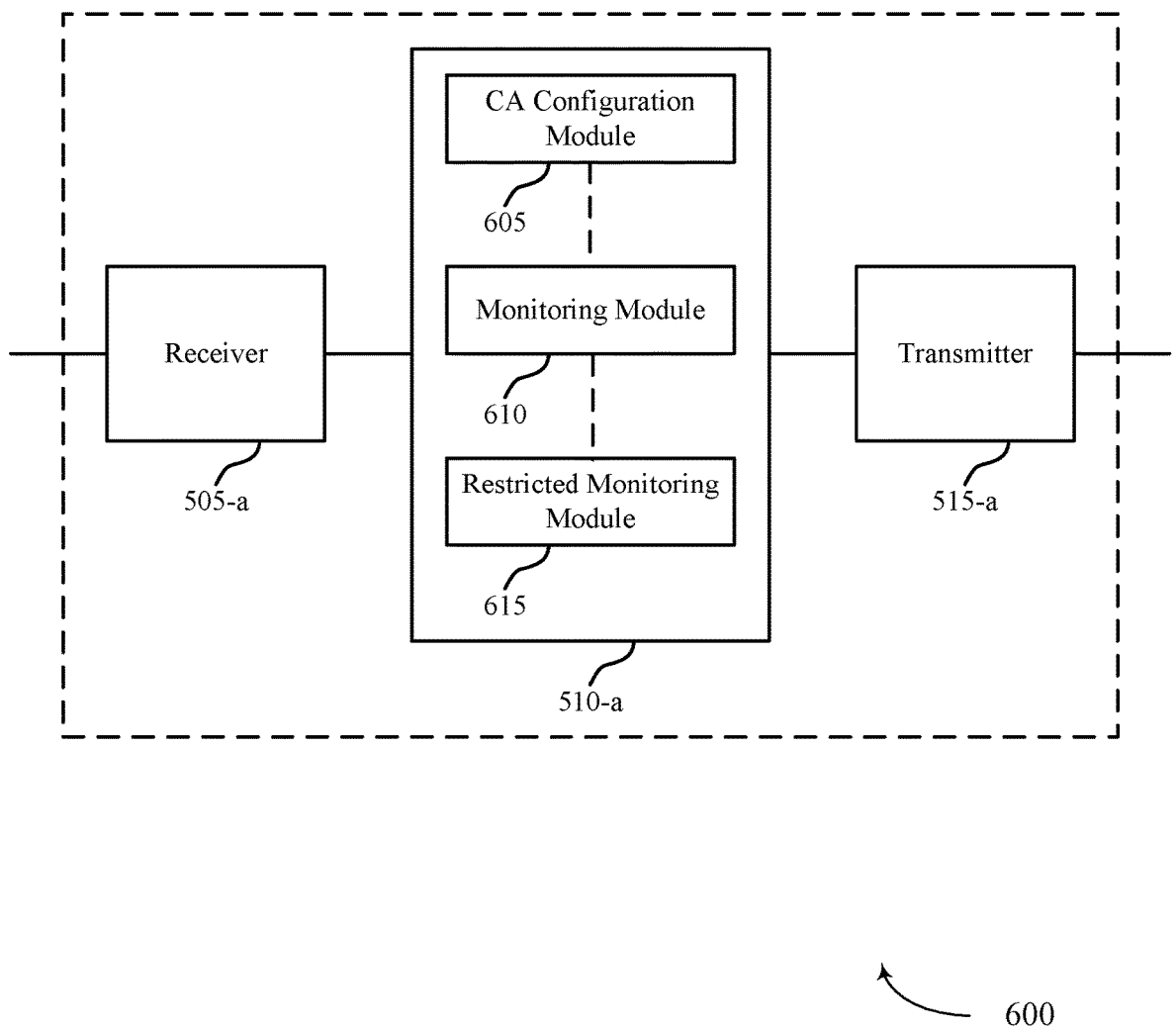

FIG. 6 shows a block diagram of a wireless device 600 that supports reducing blind decoding in enhanced carrier aggregation in accordance with various aspects of the present disclosure. Wireless device 600 may be an example of aspects of a wireless device 500 or a UE 115 described with reference to FIGS. 1-5. Wireless device 600 may include a receiver 505-a, an eCA blind decoding module 510-a, or a transmitter 515-a. Wireless device 600 may also include a processor. Each of these components may be in communication with each other. The eCA blind decoding module 510-a may also include a CA configuration module 605, a monitoring module 610, and a restricted monitoring module 615.

The receiver 505-a may receive information which may be passed on to eCA blind decoding module 510-a, and to other components of wireless device 600. The eCA blind decoding module 510-a may perform the operations described with reference to FIG. 5. The transmitter 515-a may transmit signals received from other components of wireless device 600.

The CA configuration module 605 may receive a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction as described with reference to FIGS. 2-4. In some examples, the second control channel restriction may be based on a CA configuration including more than five CCs. In some examples, the second control channel restriction may be based on a CA configuration including more than five CCs.

The monitoring module 610 may monitor a control channel of the one or more first CCs according to the first control channel restriction as described with reference to FIGS. 2-4.

The restricted monitoring module 615 may monitor a control channel of the one or more second CCs according to the second control channel restriction as described with reference to FIGS. 2-4. In some examples, the second control channel restriction may include a limited number of aggregation levels, a limited set of control information channels, a limited number of decoding candidates, a CSI limitation, a control region limitation, a DL transmission mode limitation, or an uplink transmission mode limitation transmission mode limitation, or any combination thereof.

Figure 7:
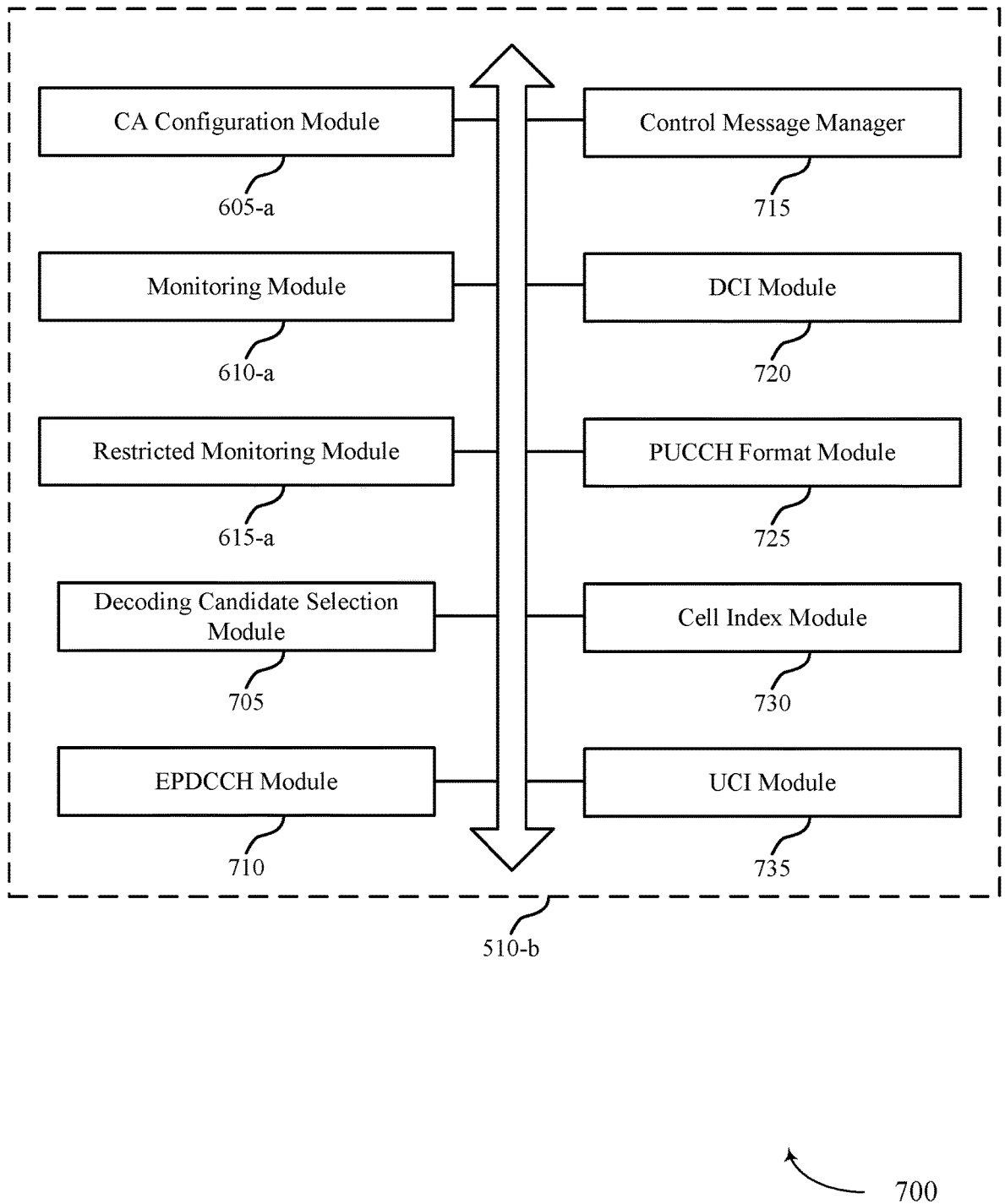

FIG. 7 shows a block diagram 700 of an eCA blind decoding module 510-b which may be a component of a wireless device 500 or a wireless device 600 that supports reducing blind decoding in enhanced carrier aggregation in accordance with various aspects of the present disclosure. The eCA blind decoding module 510-b may be an example of aspects of an eCA blind decoding module 510 described with reference to FIGS. 5-6. The eCA blind decoding module 510-*b* may include a CA configuration module 605-*a*, a monitoring module 610-*a*, and a restricted monitoring module 615-*a*. Each of these modules may perform the functions described with reference to FIG. 6. The eCA blind decoding module 510-*b* may also include a decoding candidate selection module 705, an ePDCCH module 710, a control message manager 715, a DCI module 720, a PUCCH format module 725, a cell index module 730, and a UCI module 735.

The decoding candidate selection module 705 may be configured such that monitoring the control channel of the one or more first CCs may include blindly decoding a first number of control message candidates for the one or more first CCs as described with reference to FIGS. 2-4. In some examples, monitoring the control channel of the one or more first CCs includes blindly decoding a second number of control message candidates for the one or more second CCs, and the second number may be less than the first number, and based on the first and second control channel restriction.

The ePDCCH module 710 may be configured to manage the reception of ePDCCH messages. In some cases, one or more first CCs are associated with a PDCCH configuration and the one or more second CCs are associated with an ePDCCH configuration as described with reference to FIGS. 2-4. In some examples, the one or more first CCs and the second CCs are grouped based on a limitation on a number of ePDCCH CCs. In some examples, the one or more first CCs and the second CCs are grouped based on a limitation on a number of ePDCCH CCs.

The control message manager 715 may decode a control message based on monitoring the control channel of the one or more first CCs, and the second control channel restriction may be based on the first control message as described with reference to FIGS. 2-4. The control message manager 715 may also decode a control message prior to monitoring the control channel for the one or more second CCs, where the second control channel restriction may be based on the control message. The control message manager 715 may also decode a control message based on monitoring the control channel for the one or more second CCs, and the control message may include a virtual CRC based on a restricted data allocation within a data field. The control message manager 715 may receive a plurality of control messages associated with a plurality of CCs of the CA configuration.

The DCI module 720 may decode DCI from the plurality of control messages, where the DCI may include a PUCCH format indication as described with reference to FIGS. 2-4. The DCI module 720 may also receive the UCI is based on the plurality of CCs including more than five CCs.

The PUCCH format module 725 may transmit a control message corresponding to at least one of the plurality of CCs according to the PUCCH format indication as described with reference to FIGS. 2-4. In some examples, the PUCCH format indication may be based on the plurality of CCs including more than five CCs. In some examples, the indication of the PUCCH format may be based on the plurality of CCs including more than five CCs.

The cell index module 730 may identify a cell index for each of the plurality of CCs based on the plurality of control messages as described with reference to FIGS. 2-4.

The UCI module 735 may transmit UCI based on CC having a lowest cell index of the plurality of CCs as described with reference to FIGS. 2-4. In some examples, the UCI may be transmitted using PUSCH resources. The UCI module 735 may also transmit the UCI based on the plurality of CCs including more than five CCs. In some examples, the UCI may be received using PUSCH resources.

Figure 8:
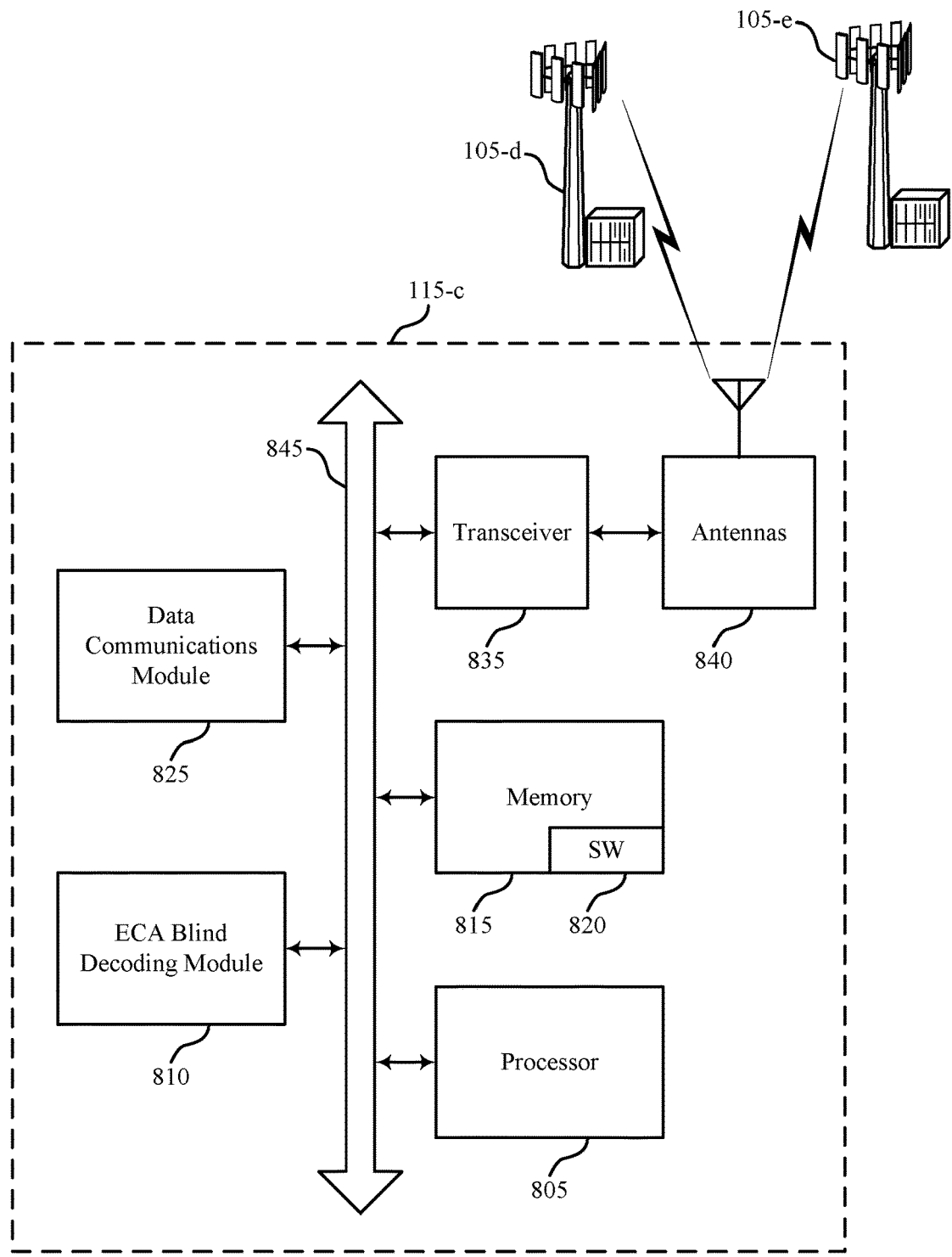
FIG. 8 illustrates a block diagram of a system including a user equipment (UE) that supports reducing blind decoding in enhanced carrier aggregation in accordance with various aspects of the present disclosure.

FIG. 8 shows a diagram of a system 800 including a UE 115 that supports reducing blind decoding in enhanced carrier aggregation in accordance with various aspects of the present disclosure. System 800 may include UE 115-*c*, which may be an example of a wireless device 500, a wireless device 600, or a UE 115 described with reference to FIGS. 1, 2 and 5-7. UE 115-*c* may include an eCA blind decoding module 810, which may be an example of an eCA blind decoding module 510 described with reference to FIGS. 5-7. UE 115-*c* may also include a eCA module 825. UE 115-*c* may also include components for bi-directional voice and data communications including components for transmitting communications and components for receiving communications. For example, UE 115-*c* may communicate bi-directionally with base station 105-*d* or base station 105-*e*.

eCA module 825 may manage eCA operations. eCA operations may include utilizing more than five CCs, utilizing unlicensed spectrum, or utilizing one or more eCCs as described with reference to FIG. 1.

UE 115-*c* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*c* may include a single antenna 840, UE 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., reducing blind decoding in enhanced carrier aggregation, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
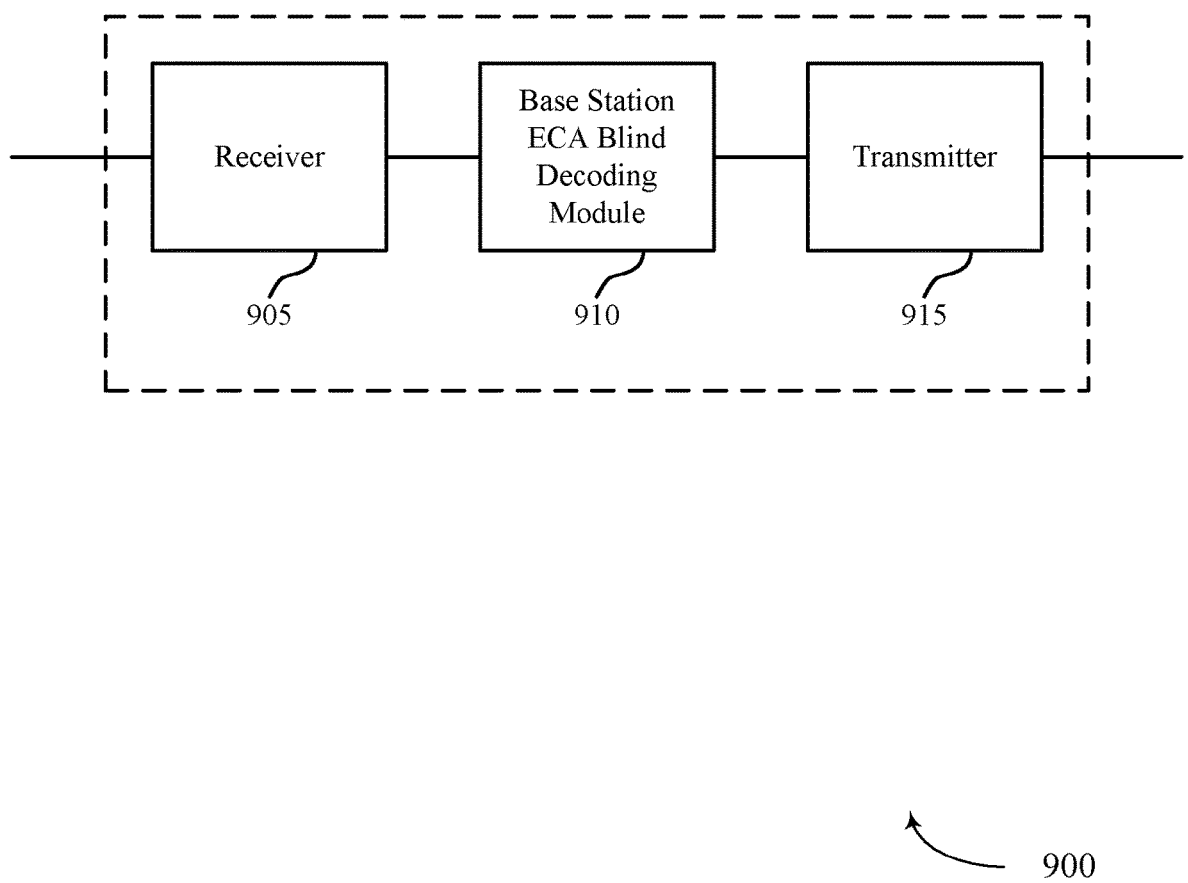
FIGS. 9-11 show block diagrams of a wireless device that supports reducing blind decoding in enhanced carrier aggregation in accordance with various aspects of the present disclosure.

FIG. 9 shows a block diagram of a wireless device 900 that supports reducing blind decoding in enhanced carrier aggregation in accordance with various aspects of the present disclosure. Wireless device 900 may be an example of aspects of a base station 105 described with reference to FIGS. 1-8. Wireless device 900 may include a receiver 905, a base station eCA blind decoding module 910, or a transmitter 915. Wireless device 900 may also include a processor. Each of these components may be in communication with each other.

The receiver 905 may receive information such as packets, user data, or control information associated with various information channels (e.g., control channels, data channels, and information related to reducing blind decoding in enhanced carrier aggregation, etc.). Information may be passed on to the base station eCA blind decoding module 910, and to other components of wireless device 900.

The base station eCA blind decoding module 910 may configure a wireless device with a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction, transmit a control channel of the one or more first CCs according to the first control channel restriction, and transmit a control channel of the one or more second CCs according to the second control channel restriction.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
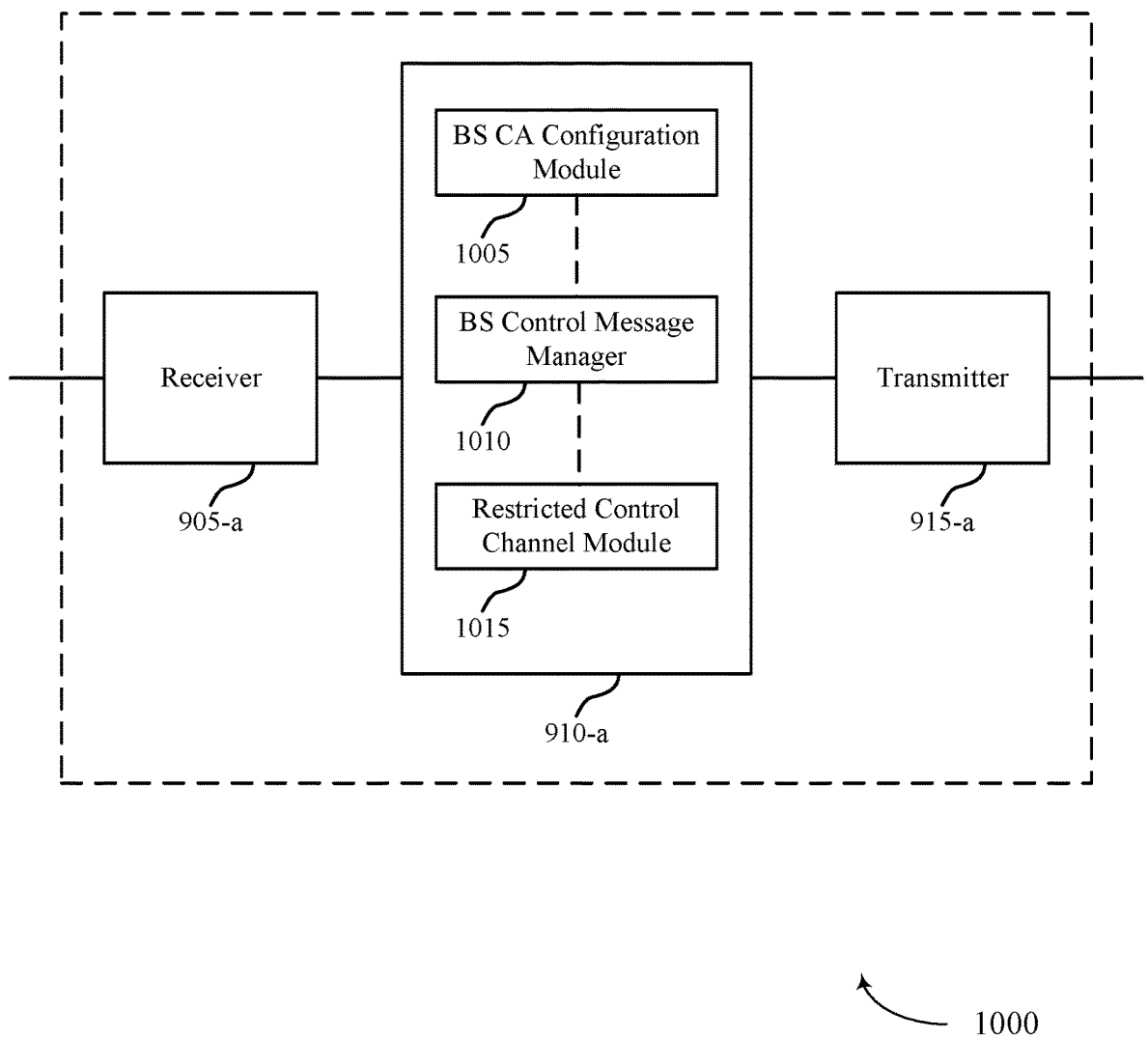

FIG. 10 shows a block diagram of a wireless device 1000 that supports reducing blind decoding in enhanced carrier aggregation in accordance with various aspects of the present disclosure. Wireless device 1000 may be an example of aspects of a wireless device 900 or a base station 105 described with reference to FIGS. 1-9. Wireless device 1000 may include a receiver 905-a, a base station eCA blind decoding module 910-a, or a transmitter 915-a. Wireless device 1000 may also include a processor. Each of these components may be in communication with each other. The base station eCA blind decoding module 910-a may also include a BS CA configuration module 1005, a BS control message manager 1010, and a restricted control channel module 1015.

The receiver 905-a may receive information which may be passed on to base station eCA blind decoding module 910-a, and to other components of wireless device 1000. The base station eCA blind decoding module 910-a may perform the operations described with reference to FIG. 9. The transmitter 915-a may transmit signals received from other components of wireless device 1000.

The BS CA configuration module 1005 may configure a wireless device with a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction as described with reference to FIGS. 2-4.

The BS control message manager 1010 may transmit a control channel of the one or more first CCs according to the first control channel restriction as described with reference to FIGS. 2-4. The BS control message manager 1010 may transmit a plurality of control messages associated with a plurality of CCs of the CA configuration The restricted control channel module 1015 may transmit a control channel of the one or more second CCs according to the second control channel restriction as described with reference to FIGS. 2-4. In some examples, the second control channel restriction includes a limited number of aggregation levels, a limited set of control information channels, a limited number of decoding candidates, a CSI limitation, a control region limitation, a DL transmission mode limitation, or an uplink transmission mode limitation transmission mode limitation, or any combination thereof. The restricted control channel module 1015 may also transmit a control message based on the second control channel restriction, where the control message may include a virtual CRC based on a restricted data allocation within a data field.

Figure 11:
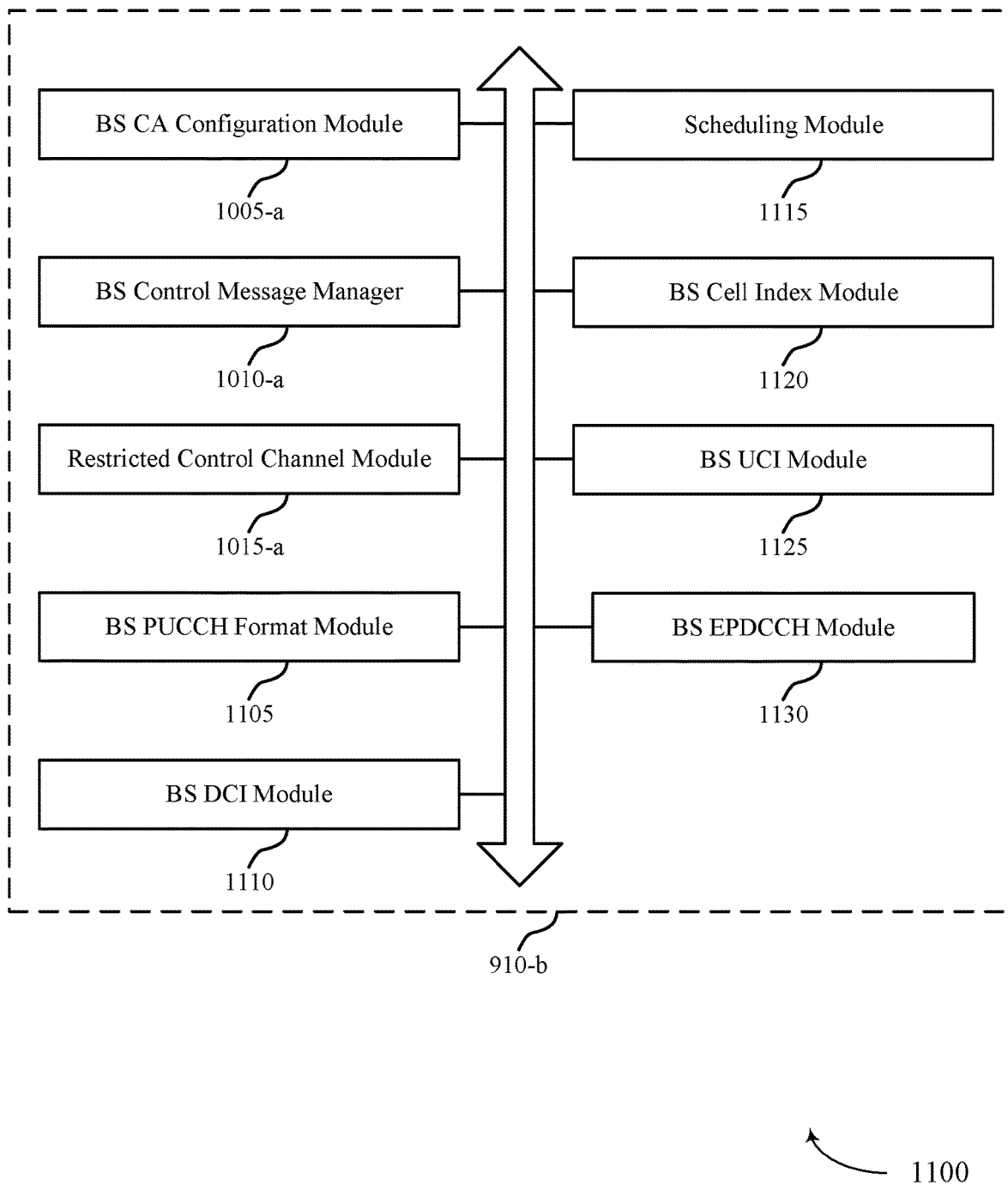

FIG. 11 shows a block diagram 1100 of a base station eCA blind decoding module 910-b which may be a component of a wireless device 900 or a wireless device 1000 for reducing blind decoding in enhanced carrier aggregation in accordance with various aspects of the present disclosure. The base station eCA blind decoding module 910-b may be an example of aspects of a base station eCA blind decoding module 910 described with reference to FIGS. 9-10. The base station eCA blind decoding module 910-b may include a BS CA configuration module 1005-a, a BS control message manager 1010-a, and a restricted control channel module 1015-a. Each of these modules may perform the functions described with reference to FIG. 10. The base station eCA blind decoding module 910-b may also include a BS PUCCH format module 1105, a BS DCI module 1110, a scheduling module 1115, a BS cell index module 1120, and a BS UCI module 1125 and a BS ePDCCH module 1130.

The BS PUCCH format module 1105 may determine a PUCCH format for a wireless device based on a number of scheduled CCs as described with reference to FIGS. 2-4.

The BS DCI module 1110 may transmit DCI to the wireless device including an indication of the PUCCH format as described with reference to FIGS. 2-4.

The scheduling module 1115 may identify a CC scheduling limitation based on an association between a number of scheduled CCs and a PUCCH format as described with reference to FIGS. 2-4. The scheduling module 1115 may also schedule at least one CC for a wireless device based on the scheduling limitation. In some examples, the CC scheduling limitation may be based on the plurality of CCs including more than five CCs.

The BS cell index module 1120 may identify a CC having a lowest cell index of the plurality of CCs as described with reference to FIGS. 2-4.

The BS UCI module 1125 may receive UCI on the CC having the lowest cell index as described with reference to FIGS. 2-4.

The BS ePDCCH module 1130 may mange ePDCCH operations. For example, a UE 115 may be configured such that the one or more first CCs are associated with a PDCCH configuration and the one or more second CCs are associated with an ePDCCH configuration as described with reference to FIGS. 2-4.

Figure 12:
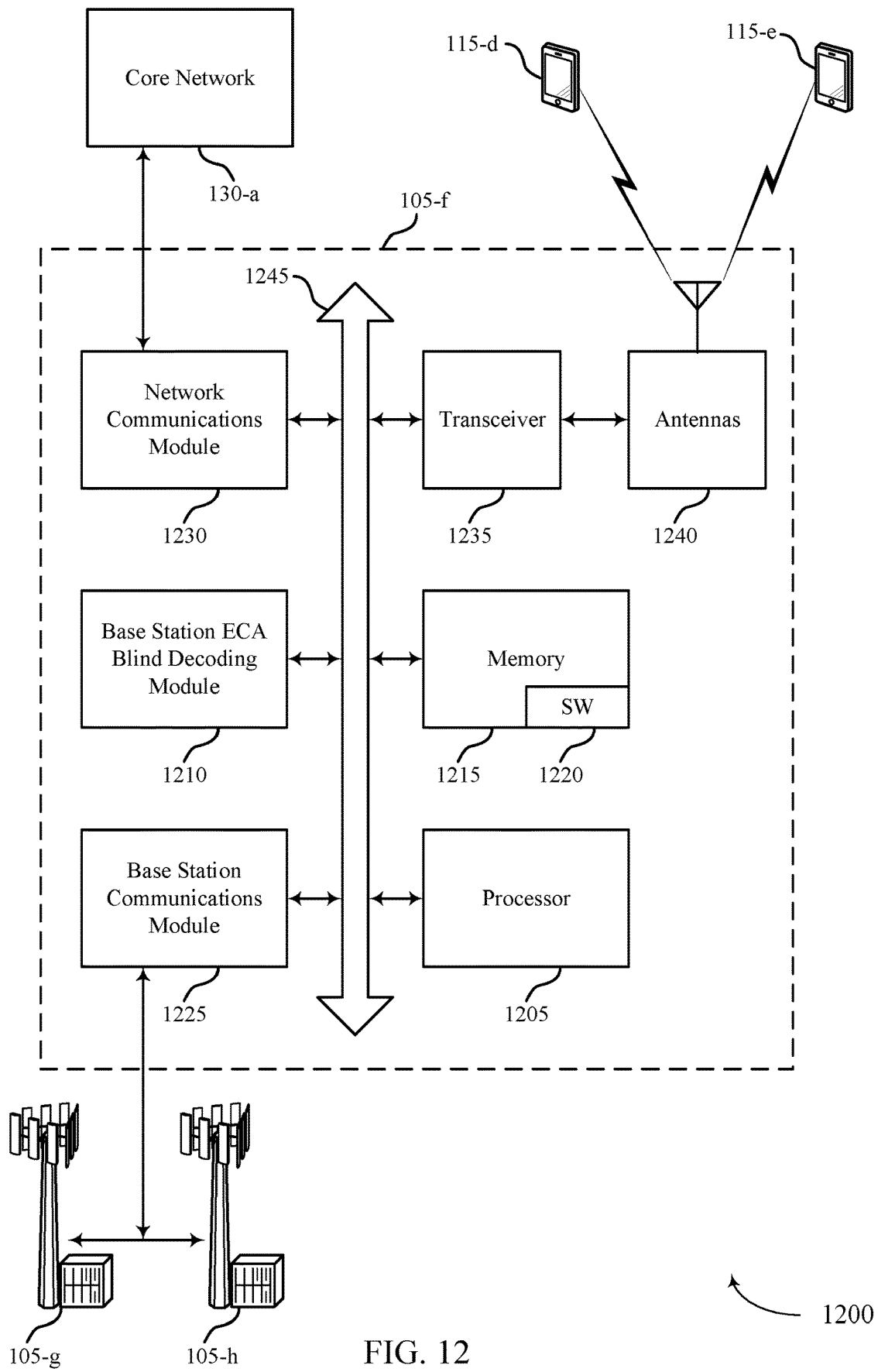
FIG. 12 illustrates a block diagram of a system including a base station that supports reducing blind decoding in enhanced carrier aggregation in accordance with various aspects of the present disclosure.

FIG. 12 shows a diagram of a system 1200 including a base station 105 configured for reducing blind decoding in enhanced carrier aggregation in accordance with various aspects of the present disclosure. System 1200 may include base station 105-f, which may be an example of a wireless device 900, a wireless device 1000, or a base station 105 described with reference to FIGS. 1, 2 and 9-11. Base Station 105-f may include a base station eCA blind decoding module 1210, which may be an example of a base station eCA blind decoding module 910 described with reference to FIGS. 9-11. Base Station 105-f may also include components for bi-directional voice and data communications including components for transmitting communications and components for receiving communications. For example, base station 105-f may communicate bi-directionally with UE 115-d or UE 115-e.

In some cases, base station 105-f may have one or more wired backhaul links. Base station 105-f may have a wired backhaul link (e.g., S1 interface, etc.) to the core network 130. Base station 105-f may also communicate with other base stations 105, such as base station 105-g and base station 105-*h* via inter-base station backhaul links (e.g., an X2 interface). Each of the base stations 105 may communicate with UEs 115 using the same or different wireless communications technologies. In some cases, base station 105-*f* may communicate with other base stations such as 105-*g* or 105-*h* utilizing base station communications module 1225. In some examples, base station communications module 1225 may provide an X2 interface within an LTE/LTE-A wireless communication network technology to provide communication between some of the base stations 105. In some examples, base station 105-*f* may communicate with other base stations through core network 130. In some cases, base station 105-*f* may communicate with the core network 130 through network communications module 1230.

The base station 105-*f* may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-*f*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*f* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., reducing blind decoding in enhanced carrier aggregation, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. In some cases, a communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of wireless device 500, wireless device 600, eCA blind decoding module 510, system 800, wireless device 900, wireless device 1000, base station eCA blind decoding module 910, and system 1200 may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
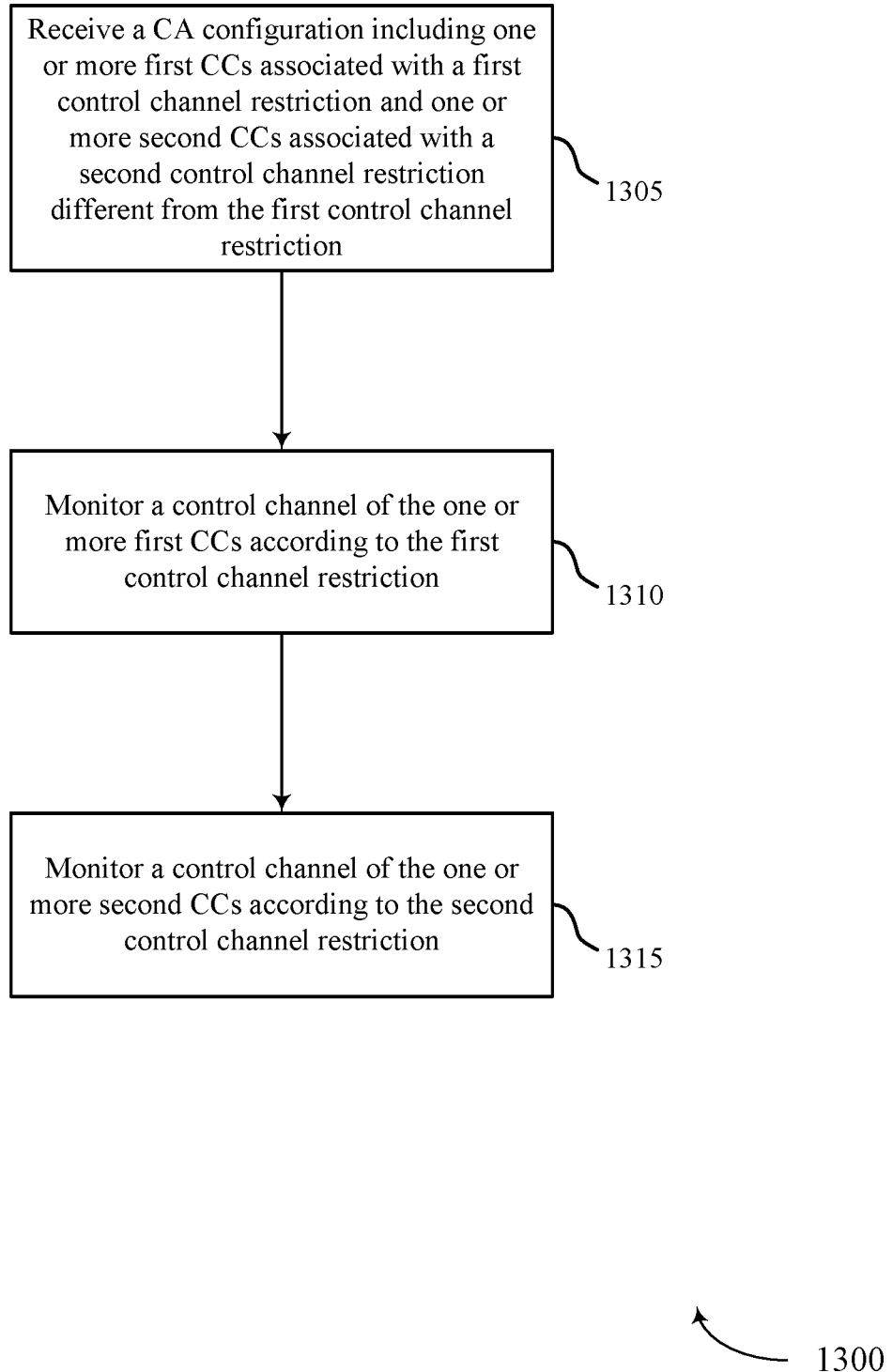
FIGS. 13-18 illustrate methods for reducing blind decoding in enhanced carrier aggregation in accordance with various aspects of the present disclosure.

FIG. 13 shows a flowchart illustrating a method 1300 for reducing blind decoding in enhanced carrier aggregation in accordance with various aspects of the present disclosure. The operations of method 1300 may be implemented by a UE 115 or its components as described with reference to FIGS. 1-12. For example, the operations of method 1300 may be performed by the eCA blind decoding module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may receive a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction as described with reference to FIGS. 2-4. In certain examples, the operations of block 1305 may be performed by the CA configuration module 605 as described with reference to FIG. 6.

At block 1310, the UE 115 may monitor a control channel of the one or more first CCs according to the first control channel restriction as described with reference to FIGS. 2-4. In certain examples, the operations of block 1310 may be performed by the monitoring module 610 as described with reference to FIG. 6.

At block 1315, the UE 115 may monitor a control channel of the one or more second CCs according to the second control channel restriction as described with reference to FIGS. 2-4. In certain examples, the operations of block 1315 may be performed by the restricted monitoring module 615 as described with reference to FIG. 6.

Figure 14:
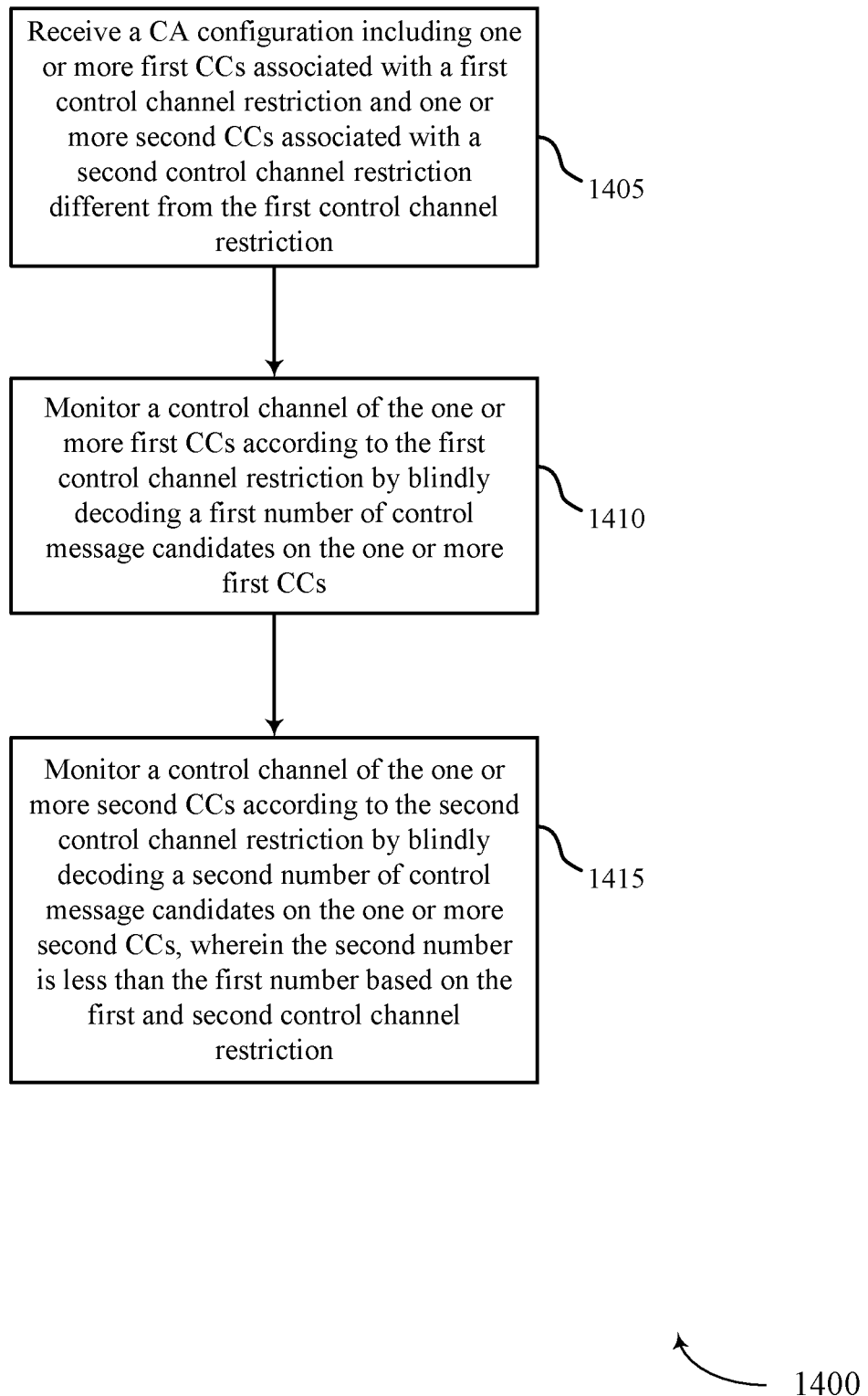

FIG. 14 shows a flowchart illustrating a method 1400 for reducing blind decoding in enhanced carrier aggregation in accordance with various aspects of the present disclosure. The operations of method 1400 may be implemented by a UE 115 or its components as described with reference to FIGS. 1-12. For example, the operations of method 1400 may be performed by the eCA blind decoding module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may receive a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction as described with reference to FIGS. 2-4. In certain examples, the operations of block 1405 may be performed by the CA configuration module 605 as described with reference to FIG. 6.

At block 1410, the UE 115 may monitor a control channel of the one or more first CCs according to the first control channel restriction as described with reference to FIGS. 2-4. In some cases, monitoring the control channel of the one or more first CCs may include blindly decoding a first number of control message candidates for the one or more first CCs. In certain examples, the operations of block 1410 may be performed by the monitoring module 610 as described with reference to FIG. 6.

At block 1415, the UE 115 may monitor a control channel of the one or more second CCs according to the second control channel restriction as described with reference to FIGS. 2-4. In some cases, monitoring the control channel of the one or more second CCs may include blindly decoding a second number of control message candidates for the one or more second CCs, and the second number may be less than the first number based on the first and second control channel restriction. In certain examples, the operations of block 1415 may be performed by the restricted monitoring module 615 as described with reference to FIG. 6.

Figure 15:
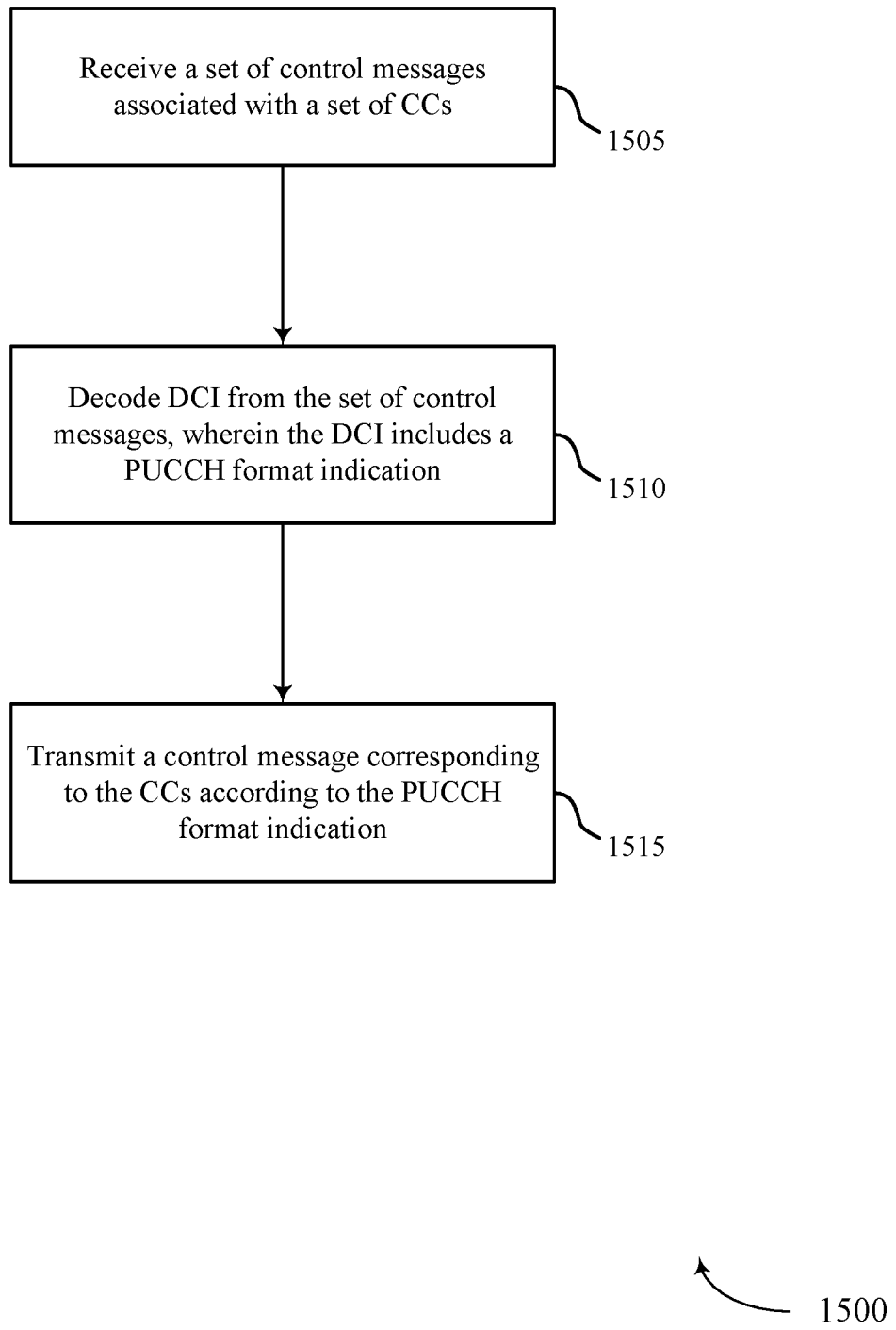

FIG. 15 shows a flowchart illustrating a method 1500 for reducing blind decoding in enhanced carrier aggregation in accordance with various aspects of the present disclosure. The operations of method 1500 may be implemented by a UE 115 or its components as described with reference to FIGS. 1-12. For example, the operations of method 1500 may be performed by the eCA blind decoding module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may receive a plurality of control messages associated with a plurality of CCs of the CA configuration as described with reference to FIGS. 2-4. In certain examples, the operations of block 1505 may be performed by the control message manager 715 as described with reference to FIG. 7.

At block 1510, the UE 115 may decode DCI from the plurality of control messages, and the DCI may include a PUCCH format indication as described with reference to FIGS. 2-4. In certain examples, the operations of block 1510 may be performed by the DCI module 720 as described with reference to FIG. 7.

At block 1515, the UE 115 may transmit a control message corresponding to at least one of the plurality of CCs according to the PUCCH format indication as described with reference to FIGS. 2-4. In certain examples, the operations of block 1515 may be performed by the PUCCH format module 725 as described with reference to FIG. 7.

Figure 16:
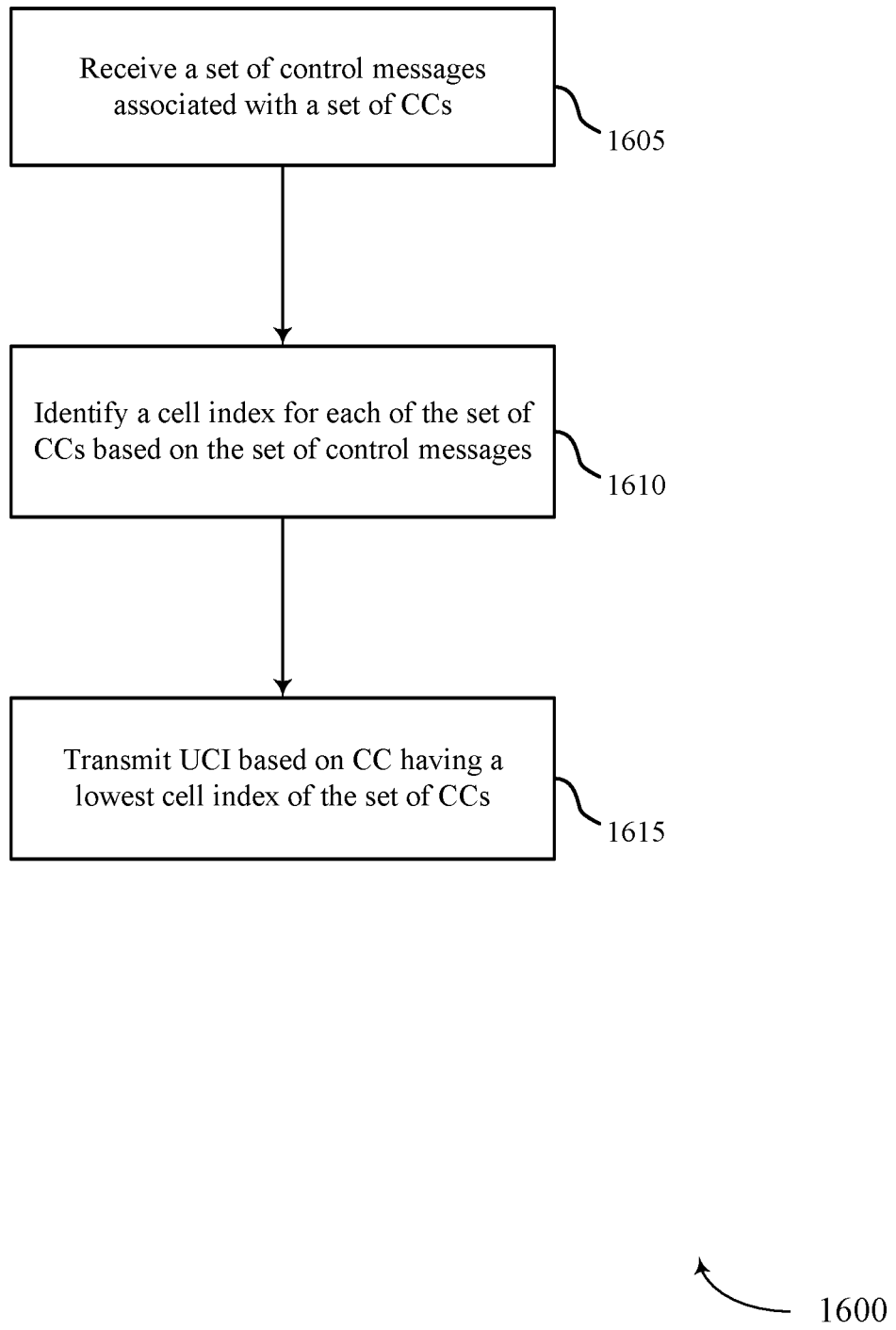

FIG. 16 shows a flowchart illustrating a method 1600 for reducing blind decoding in enhanced carrier aggregation in accordance with various aspects of the present disclosure. The operations of method 1600 may be implemented by a UE 115 or its components as described with reference to FIGS. 1-12. For example, the operations of method 1600 may be performed by the eCA blind decoding module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may receive a plurality of control messages associated with a plurality of CCs of the CA configuration as described with reference to FIGS. 2-4. In certain examples, the operations of block 1605 may be performed by the control message manager 715 as described with reference to FIG. 7.

At block 1610, the UE 115 may identify a cell index for each of the plurality of CCs based on the plurality of control messages as described with reference to FIGS. 2-4. In certain examples, the operations of block 1610 may be performed by the cell index module 730 as described with reference to FIG. 7.

At block 1615, the UE 115 may transmit UCI based on CC having a lowest cell index of the plurality of CCs as described with reference to FIGS. 2-4. In certain examples, the operations of block 1615 may be performed by the UCI module 735 as described with reference to FIG. 7.

Figure 17:
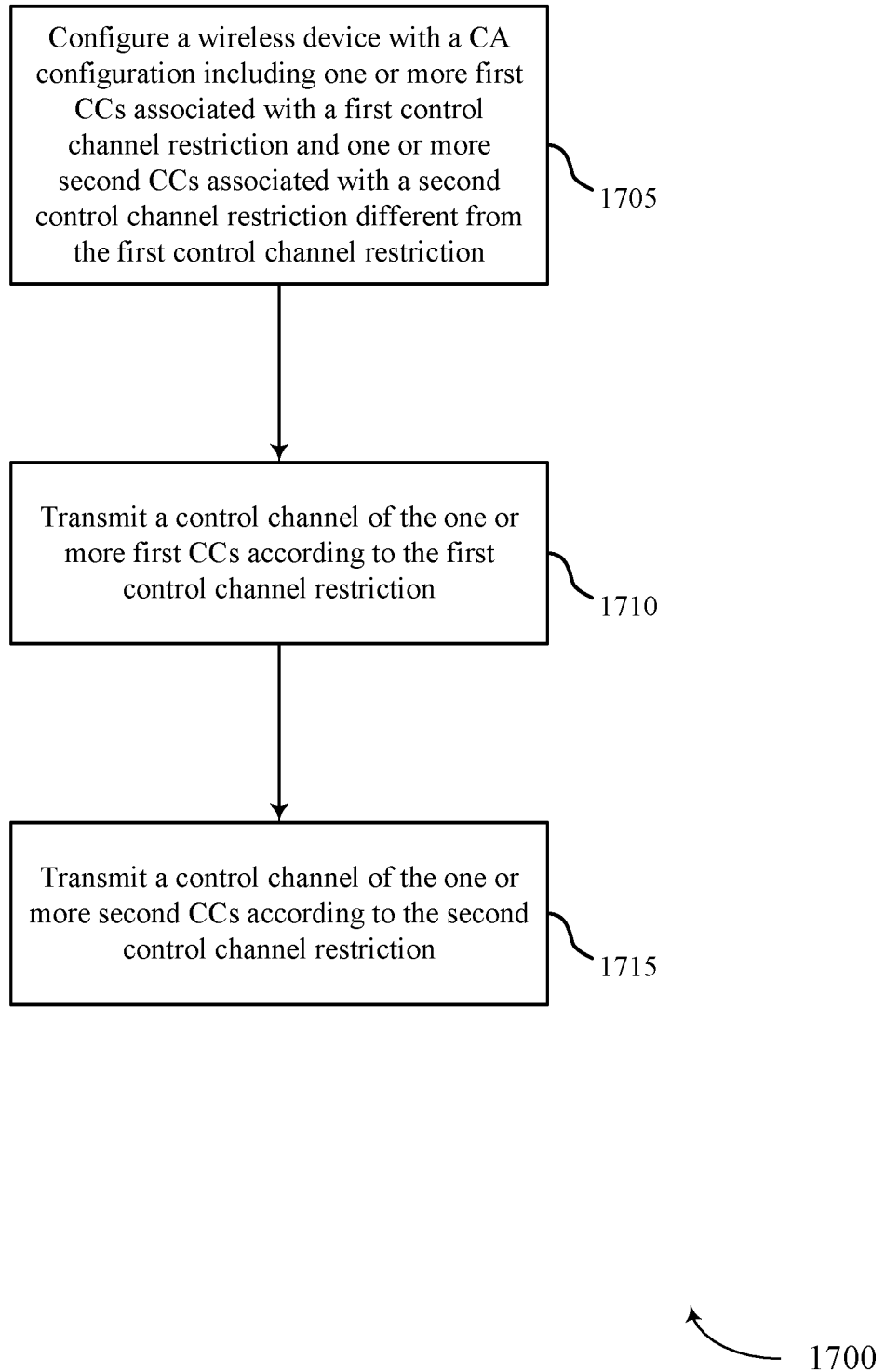

FIG. 17 shows a flowchart illustrating a method 1700 for reducing blind decoding in enhanced carrier aggregation in accordance with various aspects of the present disclosure. The operations of method 1700 may be implemented by a base station 105 or its components as described with reference to FIGS. 1-12. For example, the operations of method 1700 may be performed by the base station eCA blind decoding module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1300, 1400, 1500, and 1600 of FIGS. 13-16.

At block 1705, the base station 105 may configure a wireless device with a CA configuration including one or more first CCs associated with a first control channel restriction and one or more second CCs associated with a second control channel restriction different from the first control channel restriction, wherein the first control channel restriction or the second control channel restriction, or both, comprises a decoding candidate restriction as described with reference to FIGS. 2-4. In certain examples, the operations of block 1705 may be performed by the BS CA configuration module 1005 as described with reference to FIG. 10.

At block 1710, the base station 105 may transmit a control channel of the one or more first CCs according to the first control channel restriction as described with reference to FIGS. 2-4. In certain examples, the operations of block 1710 may be performed by the BS control message manager 1010 as described with reference to FIG. 10.

At block 1715, the base station 105 may transmit a control channel of the one or more second CCs according to the second control channel restriction as described with reference to FIGS. 2-4. In certain examples, the operations of block 1715 may be performed by the restricted control channel module 1015 as described with reference to FIG. 10.

Figure 18:
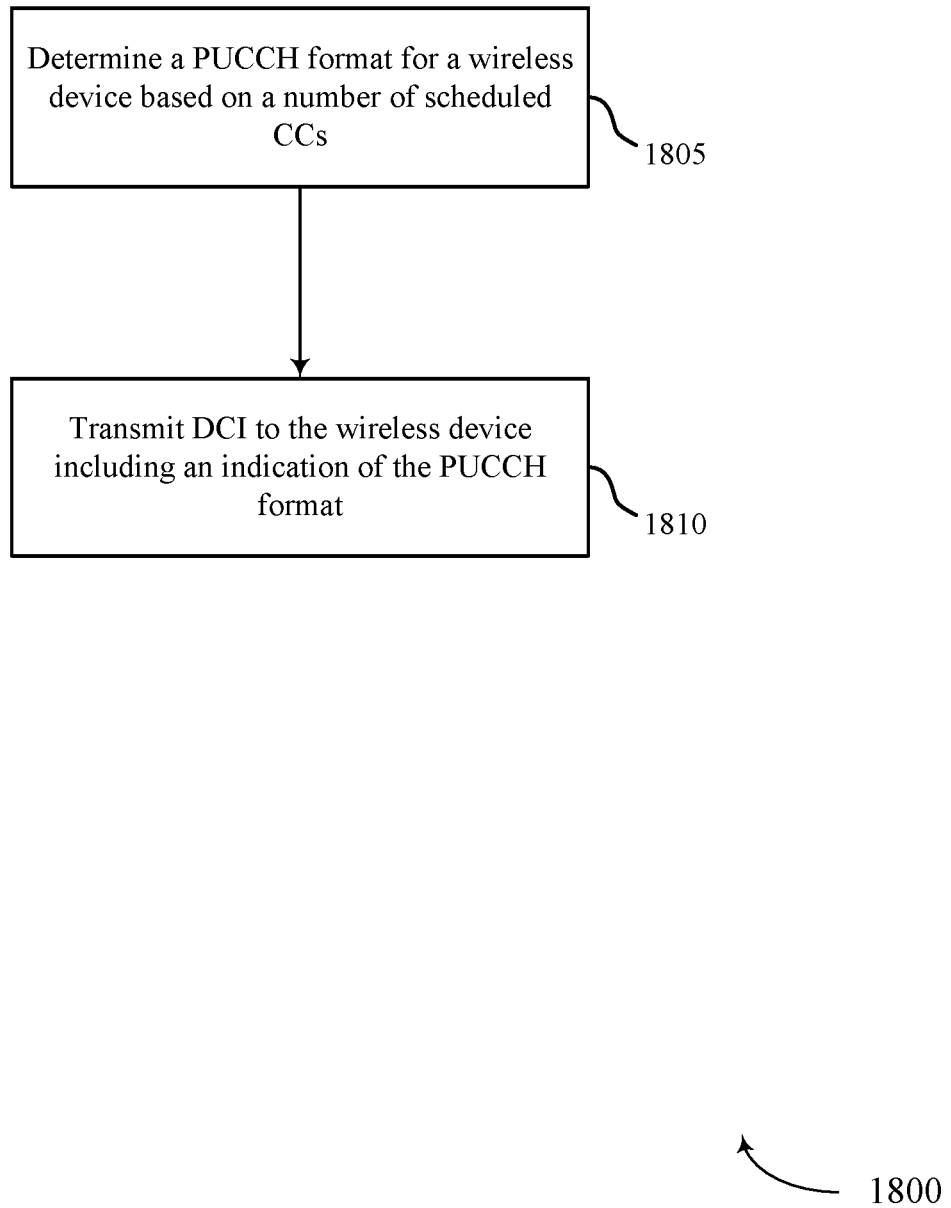

FIG. 18 shows a flowchart illustrating a method 1800 for reducing blind decoding in enhanced carrier aggregation in accordance with various aspects of the present disclosure. The operations of method 1800 may be implemented by a base station 105 or its components as described with reference to FIGS. 1-12. For example, the operations of method 1800 may be performed by the base station eCA blind decoding module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1300, 1400, 1500, 1600, and 1700 of FIGS. 13-17.

At block 1805, the base station 105 may determine a PUCCH format for a wireless device based on a number of scheduled CCs as described with reference to FIGS. 2-4. In certain examples, the operations of block 1805 may be performed by the BS PUCCH format module 1105 as described with reference to FIG. 10.

At block 1810, the base station 105 may transmit DCI to the wireless device including an indication of the PUCCH format as described with reference to FIGS. 2-4. In certain examples, the operations of block 1810 may be performed by the BS DCI module 1110 as described with reference to FIG. 10.

Thus, methods 1300, 1400, 1500, 1600, 1700, and 1800 may provide for reducing blind decoding in enhanced carrier aggregation. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, UMTS, LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication by a user equipment (UE), comprising:
   receiving a carrier aggregation (CA) configuration comprising a plurality of component carriers (CCs), wherein the plurality of CCs comprises a first set of CCs and a second set of CCs, each CC of the second set of CCs having a reduced number of decoding candidates relative to CCs of the first set of CCs;
   determining a decoding candidate restriction to be applied by the UE in limiting a number of blind decoding attempts of a control channel of at least one CC of the plurality of CCs in accordance with a decoding candidate configuration of the UE, wherein the decoding candidate restriction comprises a limited number of aggregation levels and a limited number of decoding candidates; and receiving the control channel of the at least one CC in accordance with the decoding candidate configuration.

2. The method of claim 1, further comprising:
identifying a plurality of decoding candidate configurations; and
selecting the decoding candidate configuration from the plurality of decoding candidate configurations, each of the plurality of decoding candidate configurations including one or more physical downlink control channel (PDCCH) candidates.

3. The method of claim 2, wherein each of the plurality of decoding candidate configurations is associated with a particular aggregation level.

4. The method of claim 1, further comprising:
determining one or more search spaces based at least in part on the decoding candidate configuration; and
monitoring the control channel of the at least one CC by monitoring the one or more search spaces,
wherein a starting index of the one or more common search spaces is a first control channel element (CCE) in the decoding candidate configuration.

5. The method of claim 1, further comprising:
determining a physical uplink control channel (PUCCH) format boundary of the at least one CC; and
ignoring the at least one CC based at least in part on the determined PUCCH format boundary.

6. The method of claim 1, wherein the at least one CC signals a physical uplink control channel (PUCCH) format, schedules additional transmit power, limits the transmission of aperiodic channel state information (CSI) reports, limits the use of enhanced PDCCH (ePDCCH), limits the use of cell-specific reference signal (CRS) based transmission modes, or eliminates CRS.

7. The method of claim 1, wherein at least one CC of the first set of CCs has a lesser cyclic redundancy check (CRC) length relative to the at least one CC of the second set of CCs.

8. The method of claim 7, wherein each CC of the first set of CCs has a lesser CRC length relative to CCs of the second set of CCs.

9. The method of claim 7, wherein the CRC lengths of the at least one CC of the first set of CCs and the at least one CC of the second set of CCs are based at least in part on a search space, a decoding candidate, or a radio network temporary identifier (RNTI) of a respective CC.

10. A user equipment (UE) for wireless communication, comprising:
a processor,
memory in electronic communication with the processor; and
instructions stored in the memory and executable by the processor to cause the apparatus to:
receive a carrier aggregation (CA) configuration comprising a plurality of component carriers (CCs), wherein the plurality of CCs comprises a first set of CCs and a second set of CCs, each CC of the second set of CCs having a reduced number of decoding candidates relative to CCs of the first set of CCs;
determine a decoding candidate restriction to be applied by the UE in limiting a number of blind decoding attempts of a control channel of at least one CC of the plurality of CCs in accordance with a decoding candidate configuration of the UE, wherein the decoding candidate restriction comprises a limited number of aggregation levels and a limited number of decoding candidates; and
receive the control channel of the at least one CC in accordance with the decoding candidate configuration.

11. The apparatus of claim 10, wherein the instructions are further executable by the processor to cause the apparatus to:
identify a plurality of decoding candidate configurations; and
select the decoding candidate configuration from the plurality of decoding candidate configurations, each of the plurality of decoding candidate configurations including one or more physical downlink control channel (PDCCH) candidates.

12. The apparatus of claim 11, wherein each of the plurality of decoding candidate configurations is associated with a particular aggregation level.

13. The apparatus of claim 10, wherein the instructions are further executable by the processor to cause the apparatus to:
determine one or more search spaces based at least in part on the decoding candidate configuration; and
monitor the control channel of the at least one CC by monitoring the one or more search spaces,
wherein a starting index of the one or more common search spaces is a first control channel element (CCE) in the decoding candidate configuration.

14. The apparatus of claim 10, wherein the instructions are further executable by the processor to cause the apparatus to:
determine a physical uplink control channel (PUCCH) format boundary of the at least one CC; and
ignore the at least one CC based at least in part on the determined PUCCH format boundary.

15. The apparatus of claim 10, wherein the at least one CC signals a physical uplink control channel (PUCCH) format, schedules additional transmit power, limits the transmission of aperiodic channel state information (CSI) reports, limits the use of enhanced PDCCH (ePDCCH), limits the use of cell-specific reference signal (CRS) based transmission modes, or eliminates CRS.

16. The apparatus of claim 10, wherein at least one CC of the first set of CCs has a lesser cyclic redundancy check (CRC) length relative to the at least one CC of the second set of CCs.

17. The apparatus of claim 16, wherein each CC of the first set of CCs has a lesser CRC length relative to CCs of the second set of CCs.

18. The apparatus of claim 16, wherein the CRC lengths of the at least one CC of the first set of CCs and the at least one CC of the second set of CCs are based at least in part on a search space, a decoding candidate, or a radio network temporary identifier (RNTI) of a respective CC.

19. A user equipment (UE) for wireless communication, comprising:
means for receiving a carrier aggregation (CA) configuration comprising a plurality of component carriers (CCs), wherein the plurality of CCs comprises a first set of CCs and a second set of CCs, each CC of the second set of CCs having a reduced number of decoding candidates relative to CCs of the first set of CCs;
means for determining a decoding candidate restriction to be applied by the UE in limiting a number of blind decoding attempts of a control channel of at least one CC of the plurality of CCs in accordance with a decoding candidate configuration of the UE, wherein the decoding candidate restriction comprises a limited number of aggregation levels and a limited number of decoding candidates; and means for receiving the control channel of the at least one CC in accordance with the decoding candidate configuration.

20. The apparatus of claim 19, further comprising:
means for identifying a plurality of decoding candidate configurations; and
means for selecting the decoding candidate configuration from the plurality of decoding candidate configurations, each of the plurality of decoding candidate configurations including one or more physical downlink control channel (PDCCH) candidates.

21. The apparatus of claim 19, further comprising:
means for determining one or more search spaces based at least in part on the decoding candidate configuration; and
means for monitoring the control channel of the at least one CC by monitoring the one or more search spaces, wherein a starting index of the one or more common search spaces is a first control channel element (CCE) in the decoding candidate configuration.

22. The apparatus of claim 19, further comprising:
means for determining a decoding candidate restriction to be applied by the UE in limiting a number of blind decoding attempts of a control channel of the at least one CC in accordance with a decoding candidate configuration of the UE; and
means for receiving the control channel of the at least one CC in accordance with the decoding candidate configuration.

23. The apparatus of claim 19, wherein the at least one CC signals a physical uplink control channel (PUCCH) format, schedules additional transmit power, limits the transmission of aperiodic channel state information (CSI) reports, limits the use of enhanced PDCCH (ePDCCH), limits the use of cell-specific reference signal (CRS) based transmission modes, or eliminates CRS.

24. The apparatus of claim 19, wherein at least one CC of the first set of CCs has a lesser cyclic redundancy check (CRC) length relative to the at least one CC of the second set of CCs.

25. The apparatus of claim 24, wherein each CC of the first set of CCs has a lesser CRC length relative to CCs of the second set of CCs.

26. The apparatus of claim 24, wherein the CRC lengths of the at least one CC of the first set of CCs and the at least one CC of the second set of CCs are based at least in part on a search space, a decoding candidate, or a radio network temporary identifier (RNTI) of a respective CC.

27. A non-transitory computer-readable medium storing code for wireless communication by a user equipment (UE), the code comprising instructions executable by a processor to:
receive a carrier aggregation (CA) configuration comprising a plurality of component carriers (CCs), wherein the plurality of CCs comprises a first set of CCs and a second set of CCs, each CC of the second set of CCs having a reduced number of decoding candidates relative to CCs of the first set of CCs;
determine a decoding candidate restriction to be applied by the UE in limiting a number of blind decoding attempts of a control channel of at least one CC of the plurality of CCs in accordance with a decoding candidate configuration of the UE, wherein the decoding candidate restriction comprises a limited number of aggregation levels and a limited number of decoding candidates; and
receive the control channel of the at least one CC in accordance with the decoding candidate configuration.

* * * * *